US012652150B2

(12) United States Patent
    Tsai et al.

(10) Patent No.: US 12,652,150 B2
(45) Date of Patent: Jun. 9, 2026

(54) METHOD AND DEVICE FOR PERFORMING SMALL DATA TRANSMISSION

(71) Applicant: SHARP KABUSHIKI KAISHA, Sakai City (JP)

(72) Inventors: Hsin-Hsi Tsai, Taipei (TW); Heng-Li Chin, Taipei (TW); Mei-Ju Shih, Taipei (TW); Yung-Lan Tseng, Taipei (TW); Ming-Hung Tao, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 330 days.

(21) Appl. No.: 17/846,408

(22) Filed: Jun. 22, 2022

(65) Prior Publication Data

US 2022/0416990 A1     Dec. 29, 2022

Related U.S. Application Data

(60) Provisional application No. 63/214,491, filed on Jun. 24, 2021.

(51) Int. Cl.
| | |
|---|---|
| *H04L 5/00* | (2006.01) |
| *H04W 72/044* | (2023.01) |
| *H04W 76/15* | (2018.01) |
| *H04W 76/27* | (2018.01) |
| *H04W 74/0833* | (2024.01) |
| *H04W 74/0836* | (2024.01) |
| *H04W 74/0838* | (2024.01) |

(52) U.S. Cl.
CPC ....... *H04L 5/0098* (2013.01); *H04W 72/0473* (2013.01); *H04W 76/15* (2018.02); *H04W*

*76/27* (2018.02); *H04W 74/0833* (2013.01); *H04W 74/0836* (2024.01); *H04W 74/0838* (2024.01)

(58) Field of Classification Search
None
See application file for complete search history.

(56) References Cited

U.S. PATENT DOCUMENTS

| | | | | |
|---|---|---|---|---|
| 2021/0337602 A1* | 10/2021 | Liu | ........................ | H04W 28/26 |
| 2022/0217790 A1* | 7/2022 | Qiu | ..................... | H04B 7/2041 |
| 2022/0272759 A1* | 8/2022 | Grau | ................. | H04W 74/0833 |

(Continued)

FOREIGN PATENT DOCUMENTS

| | | |
|---|---|---|
| CN | 110139365 A | 8/2019 |
| CN | 111278160 A | 6/2020 |
| WO | 2020087280 A1 | 5/2020 |

OTHER PUBLICATIONS

3GPP TS 38.331, "3rd Generation Partnership Project; Technical Specification Group Radio Access Network; NR; Radio Resource Control (RRC) protocol specification (Release 16)", V16.4.1 (Mar. 2021).

(Continued)

*Primary Examiner* — Abdelillah Elmejjarmi
(74) *Attorney, Agent, or Firm* — ScienBiziP, P.C.

(57) ABSTRACT

A method for a UE for performing SDT is provided. The method includes receiving, from a BS, system information that includes a SIB1; determining whether to initiate an SDT procedure based on one or more conditions, the one or more conditions including the SIB1 including an SDT configuration; and initiating the SDT procedure in a case that the one or more conditions are fulfilled. A UE using the method is also provided.

14 Claims, 7 Drawing Sheets

(56) References Cited

U.S. PATENT DOCUMENTS

| | | | | |
|---|---|---|---|---|
| 2023/0180338 A1* | 6/2023 | Fujishiro | .............. | H04W 76/27 |
| | | | | 370/329 |
| 2023/0224997 A1* | 7/2023 | Agiwal | ............. | H04W 56/0045 |
| 2024/0057003 A1* | 2/2024 | Chen | ................... | H04W 72/231 |
| 2024/0129954 A1* | 4/2024 | Yi | ....................... | H04W 12/037 |
| 2024/0276498 A1* | 8/2024 | Yue | ....................... | H04W 72/02 |
| 2024/0284514 A1* | 8/2024 | Sedin | ................. | H04W 74/002 |

OTHER PUBLICATIONS

3GPP TS 38.300, "3rd Generation Partnership Project; Technical Specification Group Radio Access Network; NR; NR and NG-RAN Overall Description; Stage 2 (Release 16)", V16.5.0 (Mar. 2021).

3GPP TS 38.321, "3rd Generation Partnership Project; Technical Specification Group Radio Access Network; NR; Medium Access Control (MAC) protocol specification (Release 16)", V16.4.0 (Mar. 2021).

OPPO, "Discussion on RACH based SDT", 3GPP TSG-RAN WG2 Meeting #113 electronic Online, Jan. 25-Feb. 5, 2021, R2-2100284.

Samsung, "Configured Grant based Small Data Transmission", 3GPP TSG-RAN2 Meeting #112 Electronic Nov. 2-Nov. 13, 2020, R2-2009094.

3GPP TS 38.212, "3rd Generation Partnership Project; Technical Specification Group Radio Access Network; NR; Multiplexing and channel coding (Release 16)", V16.5.0 (Mar. 2021).

3GPP TS 38.213, "3rd Generation Partnership Project; Technical Specification Group Radio Access Network; NR; Physical layer procedures for control (Release 16)", V16.5.0 (Mar. 2021).

3GPP TS 38.214, "3rd Generation Partnership Project; Technical Specification Group Radio Access Network; NR; Physical layer procedures for data (Release 16)", V16.5.0 (Mar. 2021).

* cited by examiner

<u>600</u>

602

Receive, from a BS, system information that includes a SIB1

604

Determine whether to initiate an SDT procedure based on one or more conditions, the one or more conditions including the SIB1 that includes an SDT configuration

606

Initiate the SDT procedure in a case that the one or more conditions are fulfilled

METHOD AND DEVICE FOR PERFORMING SMALL DATA TRANSMISSION

CROSS-REFERENCE TO RELATED APPLICATION(S)

The present disclosure claims the benefit of and priority to U.S. Provisional Patent Application Ser. No. 63/214,491, filed on Jun. 24, 2021, entitled "RSRP THRESHOLDS FOR SMALL DATA TRANSMISSION," the content of which is hereby incorporated fully by reference into the present disclosure for all purposes.

FIELD

The present disclosure generally relates to wireless communication and, more particularly, to methods and devices for performing small data transmission (SDT).

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in next-generation wireless communication systems.

SUMMARY

The present disclosure is directed to methods and devices for performing SDT.

According to a first aspect of the present disclosure, a method for a User Equipment (UE) for performing Small Data Transmission (SDT) is provided. The method includes receiving, from a Base Station (BS), system information that includes a System Information Block 1 (SIB1); determining whether to initiate an SDT procedure based on one or more conditions, the one or more conditions including the SIB1 including an SDT configuration; and initiating the SDT procedure in a case that the one or more conditions are fulfilled.

In some implementations of the first aspect of the present disclosure, the SDT configuration includes an SDT-specific Reference Signal Received Power (RSRP) threshold, and the one or more conditions further includes an RSRP of a Downlink (DL) pathloss reference signal being higher than the SDT-specific RSRP threshold.

In some implementations of the first aspect of the present disclosure, the SDT-specific RSRP threshold is determined by an Information Element (IE) denoted as sdt-RSRP-Threshold.

In some implementations of the first aspect of the present disclosure, the SDT configuration is determined by an Information Element (IE) denoted as sdt-ConfigCommon.

In some implementations of the first aspect of the present disclosure, the SDT procedure is initiated when the UE operates in a Radio Resource Control (RRC) inactive state.

In some implementations of the first aspect of the present disclosure, the method further includes receiving, from the BS, a Random Access (RA) configuration that includes a Reference Signal Received Power (RSRP) threshold; and selecting one of a Normal Uplink (NUL) carrier or a Supplementary Uplink (SUL) carrier as an Uplink (UL) carrier for the SDT procedure based on the RSRP threshold.

In some implementations of the first aspect of the present disclosure, the method further includes selecting the SUL carrier as the UL carrier for the SDT procedure in a case that an RSRP of a Downlink (DL) pathloss reference signal is less than the RSRP threshold.

In some implementations of the first aspect of the present disclosure, the method further includes determining whether a serving cell for the SDT procedure is configured with an SUL; and selecting the NUL carrier as the UL carrier for the SDT procedure in a case that the serving cell is not configured with the SUL.

In some implementations of the first aspect of the present disclosure, the RSRP threshold is determined by an Information Element (IE) denoted as rsrp-ThresholdSSB-SUL.

In some implementations of the first aspect of the present disclosure, the RSRP threshold has a same value for all Bandwidth Parts (BWPs) of a cell.

According to a second aspect of the present disclosure, a User Equipment (UE) for performing Small Data Transmission (SDT) is provided. The UE includes transmission and reception circuitry and at least one processor coupled to the transmission and reception circuitry. The at least one processor is configured to receive, by the transmission and reception circuitry, system information that includes a System Information Block 1 (SIB1) from a Base Station (BS); determine whether to initiate an SDT procedure based on one or more conditions, the one or more conditions comprising the SIB1 including an SDT configuration; and initiate the SDT procedure in a case that the one or more conditions are fulfilled.

In some implementations of the second aspect of the present disclosure, the SDT configuration includes an SDT-specific Reference Signal Received Power (RSRP) threshold, and the one or more conditions further comprises an RSRP of a Downlink (DL) pathloss reference signal being higher than the SDT-specific RSRP threshold.

In some implementations of the second aspect of the present disclosure, the SDT-specific RSRP threshold is determined by an Information Element (IE) denoted as sdt-RSRP-Threshold.

In some implementations of the second aspect of the present disclosure, the SDT configuration is determined by an Information Element (IE) denoted as sdt-ConfigCommon.

In some implementations of the second aspect of the present disclosure, the SDT procedure is initiated when the UE operates in a Radio Resource Control (RRC) inactive state.

In some implementations of the second aspect of the present disclosure, the at least one processor is further configured to receive, by the transmission and reception circuitry, a Random Access (RA) configuration that includes a Reference Signal Received Power (RSRP) threshold from the BS; and select one of a Normal Uplink (NUL) carrier or a Supplementary Uplink (SUL) carrier as an Uplink (UL) carrier for the SDT procedure based on the RSRP threshold.

In some implementations of the second aspect of the present disclosure, the at least one processor is further configured to select the SUL carrier as the UL carrier for the SDT procedure in a case that an RSRP of a Downlink (DL) pathloss reference signal is less than the RSRP threshold.

In some implementations of the second aspect of the present disclosure, the at least one processor is further configured to: determine whether a serving cell for the SDT procedure is configured with an SUL; and select the NUL carrier as the UL carrier for the SDT procedure in a case that the serving cell is not configured with the SUL.

In some implementations of the second aspect of the present disclosure, the RSRP threshold is determined by an Information Element (IE) denoted as rsrp-ThresholdSSB-SUL.

In some implementations of the second aspect of the present disclosure, the RSRP threshold has a same value for all Bandwidth Parts (BWPs) of a cell.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
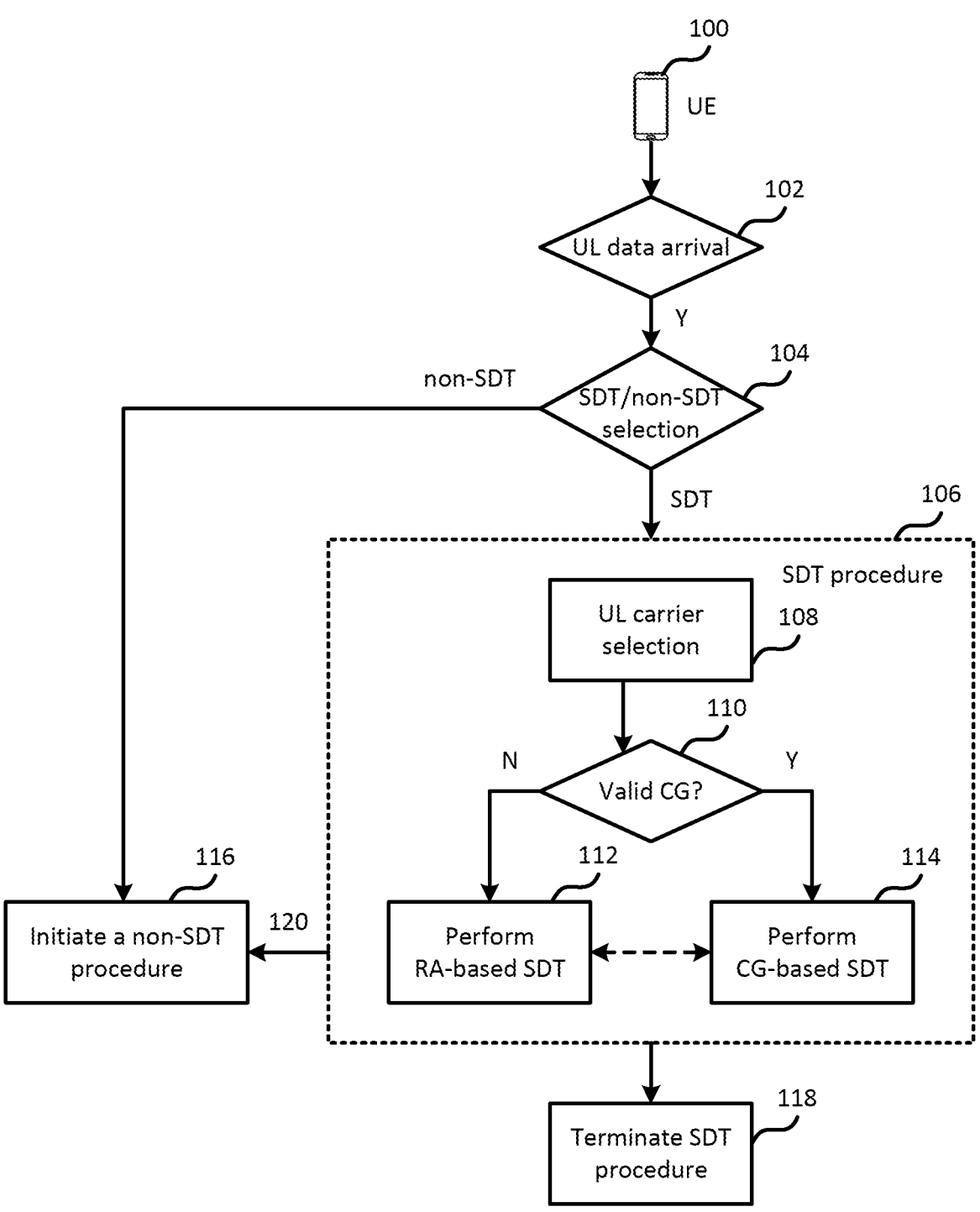
FIG. 1 is a flowchart for performing an SDT-related procedure, according to an example implementation of the present disclosure.

At least some of the acronyms in the present application are defined as follows and, unless otherwise specified, the acronyms have the following meanings:

| Acronym | Full name |
| --- | --- |
| Alt | Alternative |
| AS | Access Stratum |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |

-continued

| Acronym | Full name |
| --- | --- |
| CG | Configured Grant |
| CG-SDT | Configured Grant based Small Data Transmission |
| CI-RNTI | Cancellation Indication RNTI |
| CORESET | Control Resource Set |
| C-RNTI | Cell-Radio Network Temporary Identifier |
| CSI | Channel State Information |
| CS-RNTI | Configured Scheduling RNTI |
| CSS | Common Search Space |
| DCI | Downlink Control Information |
| DFI | Downlink Feedback Information |
| DG | Dynamic Grant |
| DL | Downlink |
| DMRS | Demodulation Reference Signal |
| DRB | Data Radio Bearer |
| DRX | Discontinuous Reception |
| FR | Frequency Range |
| HARQ | Hybrid Automatic Repeat reQuest |
| IE | Information Element |
| INT-RNTI | Interruption RNTI |
| LCH | Logical Channel |
| LCP | Logical Channel Prioritization |
| MAC | Medium Access Control |
| MCG | Master Cell Group |
| MCS-C-RNTI | Modulation Coding Scheme Cell RNTI |
| MPE | Maximum Permissible Exposure |
| MSGA | Message A |
| MSGB | Message B |
| MSGB-RNTI | Message B RNTI |
| NAS | Non-Access Stratum |
| NR | New Radio |
| NW | Network |
| NUL | Normal Uplink |
| PCell | Primacy Cell |
| PDCCH | Physical Downlink Control Channel |
| PDSCH | Physical Downlink Shared Channel |
| PDU | Protocol Data Unit |
| PS-RNTI | Power Saving RNTI |
| PHR | Power Headroom Report |
| PHY | Physical Layer |
| PRACH | Physical Random Access Channel |
| P-RNTI | Paging RNTI |
| PUCCH | Physical Uplink Control Channel |
| PUSCH | Physical Uplink Shared Channel |
| PWS | Public Warning System |
| QCL | Quasi Co Location |
| RA | Random Access |
| RACH | Random Access Channel |
| RAR | Random Access Response |
| RA-SDT | Random Access based Small Data Transmission |
| RA-RNTI | Random Access RNTI |
| Rel | Release |
| RLC | Radio Link Control |
| RNA | RAN Notification Area |
| RNTI | Radio Network Temporary Identifier |
| RO | RACH Occasion |
| RRC | Radio Resource Control |
| RS | Reference Signal |
| RSRP | Reference Signal Received Power |
| Rx | Reception |
| SCell | Secondary Cell |
| SCG | Secondary Cell Group |
| SCS | Subcarrier Spacing |
| SDT | Small Data Transmission |
| SDU | Service Data Unit |
| SFI-RNTI | Slot Format Indication RNTI |
| SI | System Information |
| SIB | System Information Block |
| SI-RNTI | System Information RNTI |
| SPS | Semi-Persistent Scheduling |
| SRB | Signaling Radio Bearer |
| SR | Scheduling Request |
| SRS | Sounding Reference Signal |
| ss | Search Space |
| SSB | SS/PBCH Block |
| SS-RSRP | Synchronization Signal-RSRP |

-continued

| Acronym | Full name |
|---|---|
| SUL | Supplementary Uplink |
| TA | Time Advance |
| TAT | Timing Alignment Timer |
| TCI | Transmission Configuration Indicator |
| TC-RNTI | Temporary Cell RNTI |
| TS | Technical Specification |
| Tx | Transmission |
| TBS | Transport Block Size |
| TRP | Transmission and Reception Point |
| TPC-PUSCH-RNTI | Transmit Power Control PUS CH RNTI |
| TPC-PUCCH-RNTI | Transmit Power Control PUCCH RNTI |
| TPC-SRS-RNTI | Transmit Power Control Sounding Reference Symbols RNTI |
| UCI | Uplink Control Information |
| UE | User Equipment |
| UL | Uplink |
| USS | UE-specific Search Space |

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "in one example" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

The terms, definitions, and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

In NR, until Rel-16, the RRC_INACTIVE state doesn't support data transmission. Hence, the UE has to resume the connection (e.g., move to RRC_CONNECTED state) for performing DL reception and/or UL data transmission. Setting up a connection and subsequently releasing to the RRC_INACTIVE state happens for each data transmission regardless of how small and infrequent the data packets are. This results in unnecessary power consumption and signaling overhead. Signaling overhead from RRC_INACTIVE state UEs due to transmission of small data packets is a general problem and will become a critical issue as the number of UEs increases in NR, not only for network performance and efficiency but also for the UE's battery performance. In general, devices that have intermittent small data packets in the RRC_INACTIVE state may benefit from enabling small data transmission in the RRC_INACTIVE state. The key enablers for small data transmission in NR, namely the RRC_INACTIVE state, 2-step RACH, 4-step RACH and/or configured grant (CG) type 1 have already been specified as part of legacy. So, this work builds on these building blocks to enable small data transmission in the RRC_INACTIVE state for NR.

Small Data Transmission (SDT) may be a procedure allowing data transmission while the UE is remaining in the RRC_INACTIVE state (e.g., without transitioning to the RRC_CONNECTED state). SDT may be enabled on a radio bearer (RB) basis and is initiated by the UE only if less than a configured amount of UL data awaits transmission across all radio bearers (e.g., SRBs and/or DRBs) for which SDT is enabled and measured RSRP in the cell is above a configured threshold.

SDT may be configured to either take place on RACH (e.g., RA-based SDT) or type 1 CG resources (e.g., CG-based SDT). For CG, the SDT resources may be configured either on an initial BWP or on a dedicated BWP. For RACH, the network also configures whether the 2-step and 4-step RA types can be used. When both can be used, the UE may select the RA type. When only the 2-step RA can be used, SDT may only be initiated if the criteria to select the 2-step RA type are also met.

Once initiated, an SDT procedure lasts as long as the UE is not explicitly directed to the RRC_IDLE state or the RRC_INACTIVE state (via RRCRelease) or to the RRC-_CONNECTED state (via RRCResume). When the UE is directed to the RRC_INACTIVE state (via RRCRelease), the UE may stop/terminate the SDT procedure and then move to the normal RRC_INACTIVE state.

After the initial SDT transmission, subsequent (small data) transmissions may be handled differently depending on the type of resources configured. For example, when using CG resources, the network may schedule subsequent UL transmission using dynamic grants. Or the subsequent UL transmission may take place on the next CG resource occasions. For example, when using RACH resources, the network may schedule subsequent UL and/or DL transmissions using dynamic grants and/or assignments after the completion of the RA procedure.

FIG. 1 is a flowchart for performing an SDT-related procedure, according to an example implementation of the present disclosure. It should be noted that although actions in FIG. 1 are illustrated as separate actions represented as independent blocks, these separately delineated actions should not be construed as necessarily order dependent. The order in which the actions are performed is not intended to be construed as a limitation, and any number of the disclosed blocks may be combined in any order to implement the method, or an alternate method. Moreover, one or more of the actions may be omitted in some of the present implementations.

The UE 100 may be in the RRC_INACTIVE state. The UE 100 may be configured with configurations for SDT (e.g., via an IE sdt-Config and/or an IE sdt-ConfigCommon). The configurations for SDT may be configured via an RRC release message (and/or via a suspend configuration), and/or via system information (e.g., an SIB). The configuration(s) for SDT may include an RACH configuration, a CG configuration (e.g., via an IE cg-SDT-config), configuration(s) for SRB/DRB used for SDT, a DRB list (e.g., via an IE sdt-DRBList), an SRB indication (e.g., via an IE SRB2Indication), etc.

In action 102, from the UE 100's perspective, UL data may be received (or have arrived) for transmission. The UL data may be associated with a specific DRB/SRB/LCH. The specific DRB/SRB/LCH may be configured for SDT. The specific DRB/SRB/LCH may be configured by a DRB list (e.g., via an IE sdt-DRBList) and/or an SRB indication (e.g., via an IE SRB2Indication). Then a UE may initiate a (RRC resume) procedure for SDT.

In action 104, selection for an SDT procedure (e.g., SDT procedure 106) or a non-SDT procedure (e.g., RRC connection resume procedure) may be performed. For example, the UE 100 (or the MAC entity of the UE 100) may be configured by the RRC layer of the UE 100 with SDT. The SDT procedure may be initiated by the RRC layer. The SDT may be performed through an RA procedure (with a 2-step RA type or with a 4-step RA type), namely, RA-SDT, or through configured grant type 1 (e.g., CG-SDT). For an SDT procedure, the UE 100 (or the MAC entity of the UE 100) may consider that the radio bearers configured with SDT are suspended for data volume calculation.

The UE 100 may determine whether to initiate an SDT procedure (e.g., an SDT procedure, an RA procedure for SDT (e.g., RA-SDT), and/or an SDT procedure with CG (e.g., CG-SDT)) or a non-SDT procedure (e.g., an RRC connection resume procedure) based on one or more criteria, e.g., including DRB/SRB, data volume, and/or RSRP, etc. In some implementations, the UE 100 may initiate the non-SDT procedure by initiating an RA procedure for a CCCH logical channel.

For example, the UE 100 may initiate the SDT procedure in action 106 when/after at least one LCH/DRB/SRB which is configured for SDT has pending data. For example, data is available for transmission for only those LCHs/DRBs/SRBs for which SDT is enabled. The LCH/DRB/SRB configured for SDT may be resumed/re-established when the UE 100 initiates the SDT procedure in action 106. Otherwise, the UE 100 may initiate the RRC connection resume based on CG (e.g., type 1 CG), e.g., CG-based SDT (or referred to as CG-SDT). The UE 100 may perform the RA-based SDT in action 112 or the CG-based SDT in action 114. The UE 100 may transmit the UL data (e.g., small data), via MSG3, MSGA, CG resource, and/or PUSCH resources during the RA-SDT procedure in action 112 or during the CG-SDT procedure in action 114.

In action 108, the UE 100 may perform UL carrier selection (e.g., if an SUL is configured in the cell, the UL carrier may be selected based on RSRP threshold). After the UL carrier selection, the UE 100 may perform the SDT procedure on the selected UL carrier (e.g., a UL carrier (e.g., NUL carrier) or an SUL carrier). An example of an SDT procedure (such as, but not limited to, the SDT procedure in action 106) is provided in Table 1.

TABLE 1

| An example for SDT procedure |
|---|
| A UE/MAC entity may: |
| 1> if the data volume of the pending UL data across all logical channels configured for Small Data Transmission is less than or equal to sdt-DataVolumeThreshold: |
| 2>if the Serving Cell for Small Data Transmission is configured with a supplementary uplink as specified in TS 38.331; and |
| 2> if the RSRP of the downlink pathloss reference is less than sdt-RSRP-ThresholdSSB-SUL: |
| 3> select the SUL carrier. |
| 2> else: |
| 3> select the NUL carrier. |
| NOTE: FFS the procedure when sdt-RSRP-ThresholdSSB-SUL is not configured |
| 2> if the RSRP of the downlink pathloss reference is higher than sdt-RSRP-Threshold, if configured: |
| 3>if configured grant type 1 is configured for Small Data Transmission, and the configured grant type 1 resource is valid: |
| 4> initiate Small Data Transmission with configured grant type 1 on the selected UL carrier; |
| 4> indicate to the upper layer that conditions for initiating Small Data Transmission are fulfilled. |
| 3>else if Random Access Resources are configured for Small Data Transmission: |
| 4> initiate Random Access procedure on the selected UL carrier for Small Data Transmission; |
| 4> indicate to the upper layer that conditions for initiating Small Data Transmission are fulfilled. |
| 3>else: |
| 4> initiate Random Access procedure for CCCH logical channel (e.g., not for Small Data Transmission); |
| 2>else: |
| 3>initiate Random Access procedure for CCCH logical channel (e.g., not for Small Data Transmission); |
| 1> else: |
| 2>initiate Random Access procedure for CCCH logical channel (e.g., not for Small Data Transmission); | procedure when/after at least one LCH/DRB/SRB which is not configured for SDT has pending data.

For example, the UE 100 may initiate the SDT procedure in action 106 if the data volume for transmission (e.g., for SDT) is lower than a configured threshold for SDT. The data volume may only count the (total) volume of the LCHs/DRBs/SRBs configured for SDT. Otherwise, the UE 100 may initiate a non-SDT procedure (e.g., an RRC connection resume procedure) in action 116 if the data volume for transmission (e.g., for SDT) is higher than a configured threshold for SDT.

For example, the UE 100 may initiate the SDT procedure in action 106 if an RSRP is larger than a configured RSRP threshold for SDT. Otherwise, the UE 100 may initiate a non-SDT procedure (e.g., an RRC connection resume procedure) in action 116 if an RSRP is lower than a configured RSRP threshold for SDT.

There may be two types of SDT procedure: one is based on an RA procedure (e.g., 2-step RA or 4-step RA), e.g., RA-based SDT (or referred to as RA-SDT); the other is In action 110, the UE 100 may determine whether there is a valid CG. For example, the UE 100 may determine whether a CG resource/configuration is valid (during the SDT procedure) in action 110 based on one or more of the following criteria (1) to (4):

(1) The UE 100 may determine whether a CG resource/configuration is valid based on whether the associated beam is valid. Whether the associated beam is valid may be based on an RSRP threshold. The RSRP threshold may be configured in the RRC release message and/or the CG configuration. For example, if there is at least one beam with RSRP above the RSRP threshold, the UE 100 may consider the CG resource/configuration is valid. If there is no beam with RSRP above the RSRP threshold, the UE 100 may consider the CG resource/configuration is not valid.

(2) The UE 100 may determine whether a CG resource/configuration is valid based on whether a TA is valid. The UE 100 may determine the CG resource/configuration is valid while the TA is valid. If the TA is not valid, the UE 100 may consider the CG resource/
configuration is not valid. Whether a TA is valid may be
based on a TA timer. For example, the UE 100 may
consider the TA is valid while the TA timer is running.
The UE 100 may consider the TA is not valid while the
TA timer is not running. The (parameter of) TA timer
may be configured in the RRC release message and/or
the CG configuration. Whether a TA is valid may be
based on an RSRP change volume. For example, the
UE 100 may consider the TA is not valid if the RSRP
change is higher than a threshold. The threshold (for
RSRP change) may be configured in the RRC release
message and/or the CG configuration. An example of
the validation for SDT using CG is provided in Table 2.

TABLE 2

An example of validation for SDT using CG

A UE may consider the time alignment
value for Small Data Transmission
using configured grant type 1 to be valid
when the following conditions are fulfilled:
1> compared to the stored downlink pathloss
reference RSRP value, the RSRP has not
increased by more than sdt-CG-RSRP-
ChangeThresholdIncrease, if configured; and
1> compared to the stored downlink pathloss
reference RSRP value, the RSRP has not
decrease by more than sdt-CG-RSRP-
ChangeThresholdDecrease, if configured (3) The UE 100 may determine whether a CG resource/
configuration is valid based on whether a CG configu-
ration is valid. For example, when the CG resource
configuration is (re-)initialized, the CG resource con-
figuration may be valid. For example, when the CG
resource configuration is released/suspended, the CG
resource configuration may be invalid. The CG
resource configuration may be configured in the RRC
release message.

(4) The UE 100 may determine whether a CG resource/
configuration is valid based on whether a timer (e.g.,
SDT failure detection timer) is running. The timer may
be configured in the RRC release message and/or the
CG configuration. For example, the UE 100 may deter-
mine that the CG resource/configuration is valid while
the timer is running. The UE 100 may determine that
CG resource/configuration is not valid while the timer
is not running or when the timer expires. The timer may
be used to detect the failure of the SDT. The timer may
be (re-)started upon transmission of UL data when the
UE 100 is in the RRC_INACTIVE state. The timer may
be (re-)started upon transmission of small data. The
timer may be (re-)started upon transmission of an RRC
resume request. The timer may be stopped upon recep-
tion of RRCResume, RRCSetup, RRCRelease,
RRCRelease with suspendConfig, or RRCReject mes-
sage, cell re-selection and upon abortion of connection
establishment by upper layers. When the timer expires,
the UE 100 may enter the action upon going to the
RRC_IDLE state (e.g., with a specific RRC resume
cause).

In action 112, if the UE 100 determines that the CG
resource/configuration is not valid, e.g., one of the criteria
for CG validity is not satisfied, the UE 100 may perform
RA-based SDT. For example, the UE 100 may initiate an RA
procedure (for SDT). The RA procedure may be either a
2-step type or a 4-step type based on the selection by the UE (e.g., according to an RSRP threshold). The UE 100 may
perform the transmission of RA preamble, e.g., via the
preamble/RA resource/PRACH resource which is config-
ured for SDT. The UE 100 may perform a UL transmission
(e.g., small data) via MSG3/MSGA.

In action 114, if the UE 100 determines that the CG is
valid, e.g., the criteria for CG validity are satisfied, the UE
100 may perform CG-based SDT. For example, the UE 100
may perform a UL transmission (for small data) via CG
resource.

In action 116, if the criteria (e.g., DRB/SRB, data volume,
and/or RSRP) for initiating the SDT procedure is not satis-
fied, the UE 100 may initiate a non-SDT procedure (e.g.,
RRC connection resume procedure), e.g., the UE 100 may
initiate an RA procedure for CCCH logical channel.

In action 118, the SDT procedure may be terminated/
stopped/completed by an indication from the NW (e.g., via
an RRC release message), by a timer (e.g., an SDT failure
detection timer expires), and/or by a counter (e.g., the value
of the counter reaches a maximum value).

In action 120, the SDT procedure may fallback/switch to
the non-SDT procedure (e.g., RRC connection resume pro-
cedure). For example, when the UE 100 receives an indi-
cation (e.g., fallback indication) from the NW (e.g., an RRC
resume/RRC release message), the UE 100 may stop/termi-
nate/complete the SDT procedure in action 106 and then
may initiate a non-SDT procedure (e.g., an RRC connection
resume procedure) in action 116. In another example, if the
initial UL transmission (e.g., in MSGA/MSG3/CG
resources) fails a configured number of times, the UE 100
may stop/terminate/complete the SDT procedure and then
may initiate an RRC connection resume procedure.

Figure 2:
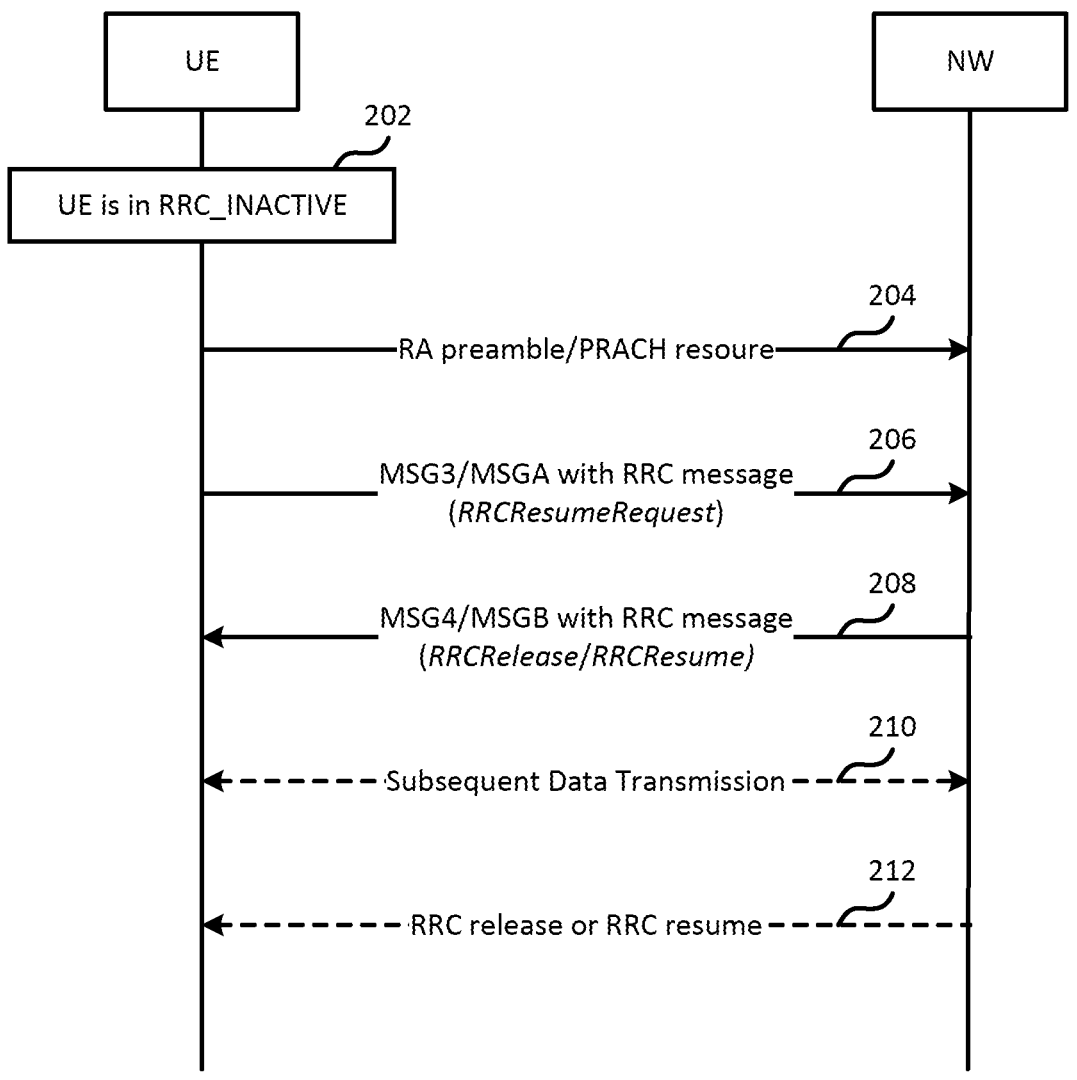
FIG. 2 is a communication diagram that illustrates an RA-based SDT procedure, according to an example implementation of the present disclosure.

FIG. 2 is a communication diagram that illustrates an
RA-based SDT procedure, according to an example imple-
mentation of the present disclosure.

In action 202, the UE is in the RRC_INACTIVE state.

In action 204, the UE in the RRC_INACTIVE state may
transmit an RA preamble/PRACH resource to the network
(NW). For example, when the UE in the RRC_INACTIVE
state has UL data available for transmission and/or an SDT
procedure has been initiated, the UE may initiate an RA-
based SDT procedure for the transmission of the UL data
(e.g., in a case that the CG is considered as not valid). The
UE may select a 4-step RA type or a 2-step RA type. Once
the 4-step RA type is selected, a 4-step RA procedure is
performed. Once the 2-step RA type is selected, a 2-step RA
procedure is performed.

In some implementations, the RA preamble/PRACH
resource for the RA-based SDT procedure (e.g., RA pre-
amble/PRACH resource configured for SDT) and that for
the normal RA procedure (e.g., RA preamble not configured
for SDT) may be different. Here, the UE may select the RA
preamble/PRACH resource configured for SDT.

In action 206, after transmitting the RA preamble, the UE
may transmit an RRC message (e.g., a CCCH message),
MAC CE(s), and/or UL data through MSG3 (when 4-step
RA type is selected) or MSGA (when 2-step RA type is
selected). The RRC message may be an RRCResumeR-
equest message. In addition to the RRC message, the MAC
CE (e.g., BSR) and the UL data (e.g., data associated with
DRB(s) for SDT) may be included in the MSG3/MSGA as
well.

In action 208, once the MSG3/MSGA is transmitted, the
UE may monitor (Temporary C-RNTI)/C-RNTI/RA-RNTI/
MSGB-RNTI for MSG4/MSGB, in which the contention
resolution ID will be carried. In an example, the NW may
transmit an RRC message in MSG4/MSGB. In another example, the NW may not transmit an RRC message in MSG4/MSGB. If the RRC message is transmitted in MSG4/MSGB, the UE may terminate the SDT procedure, and the UE may not perform action 210 and/or action 212. Message may be an RRCRelease message (e.g., with suspendConfig IE), an RRCResume message, etc. The UE may stay in the RRC_INACTIVE state if it receives an RRCRelease message (e.g., with suspendConfig IE) and may enter an RRC_CONNECTED state if the UE receives an RRCResume message, and/or enter the RRC_IDLE state if the UE receives an RRCRelease message (e.g., without suspendConfig IE). If the RRC message is not transmitted in MSG4/MSGB, the UE may keep performing the SDT procedure and may perform the action 210 and/or action 212.

In action 210, once the RA procedure for SDT is successfully completed, the UE may monitor a specific RNTI (e.g., C-RNTI) on a specific search space for subsequent data transmission. Subsequent data transmission may be the transmission of multiple UL and/or DL data packets as part of the SDT procedure and without transitioning to the RRC_CONNECTED state (e.g., the UE is still in the RRC_INACTIVE state). The UE may monitor a PDCCH via a specific RNTI (e.g., C-RNTI) to receive the dynamic scheduling for a new UL and/or DL transmission and/or a corresponding retransmission. The UE may monitor a PDCCH via a UE-specific RNTI (e.g., C-RNTI) to receive the dynamic scheduling for the retransmission of the UL transmission via a CG resource.

In action 212: the NW may send an RRC release message (with suspendconfig IE) to keep the UE in the RRC_INACTIVE state or move the UE to the RRC_IDLE state by sending an RRC release message. In another example, the NW may send an RRC resume message to move the UE to the RRC_CONNECTED state. Once the RRCRelease message (with suspendConfig IE) is received, the UE may terminate the SDT procedure based on the RRCRelease message, and/or stop monitoring the C-RNTI, and/or stay in the RRC_INACTIVE state.

Figure 3:
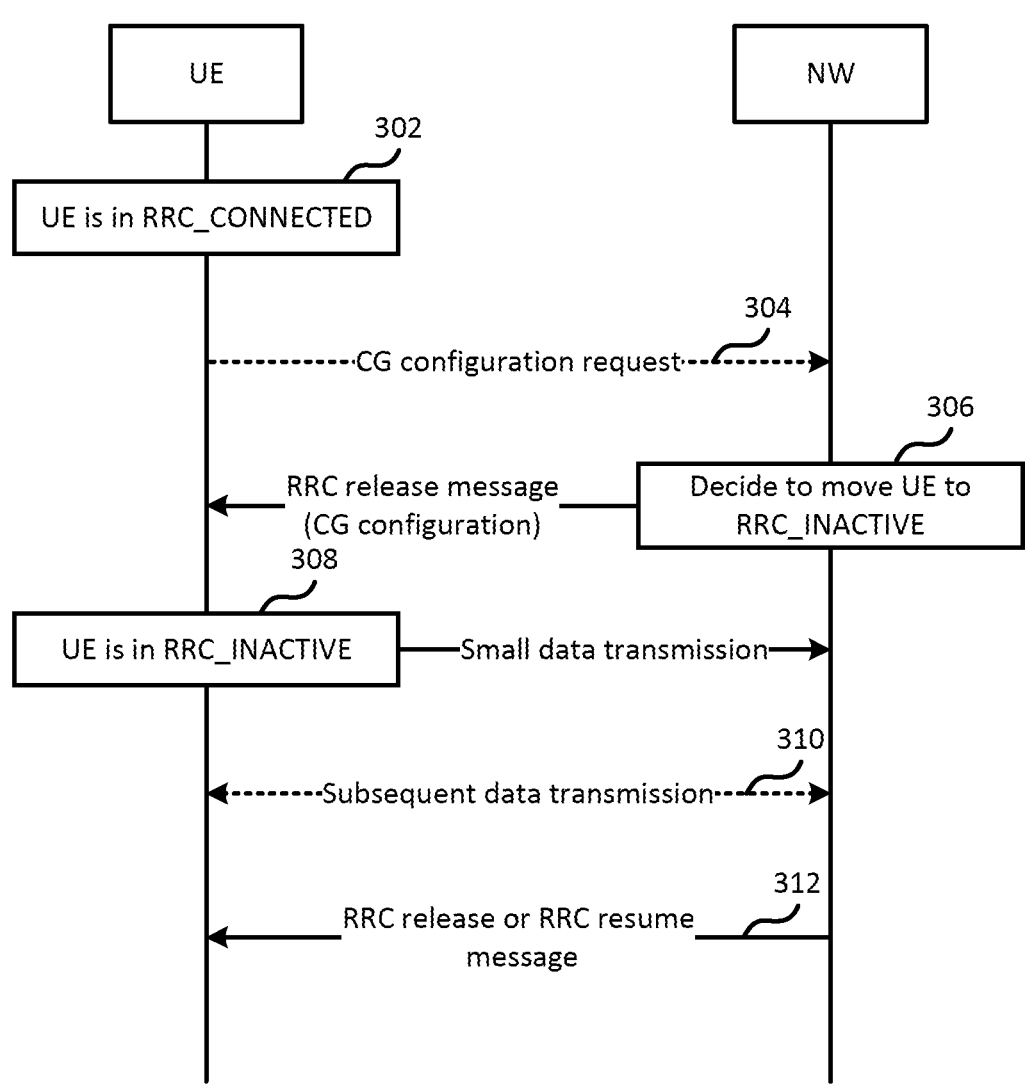
FIG. 3 is a communication diagram that illustrates a CG-based SDT procedure, according to an example implementation of the present disclosure.

FIG. 3 is a communication diagram that illustrates a CG-based SDT procedure, according to an example implementation of the present disclosure.

In action 302, the UE is in the RRC_CONNECTED state.

In action 304, while the UE is in the RRC_CONNECTED state (or the RRC_INACTIVE state), the UE may send a CG configuration request to the NW to indicate the UE's preference on a configuration with CG for small data and/or for the RRC_INACTIVE state.

In action 306, the NW may decide to move the UE to the RRC_INACTIVE state by sending an RRCRelease message (e.g., including suspendconfig IE) to the UE. The RRC release message may include at least a CG configuration to configure the CG resources to the UE. The CG configuration may include, but is not limited to, the following information: CG periodicity, TBS, number for the implicit release of the CG resources, CG Timer, retransmission timer, number of HARQ process reserved for CG in SDT, RSRP threshold for SSB selection and association between SSB and CG resources, TA-related parameters (e.g., cg-SDT-TimeAlignmentTimer), and so on.

In action 308, the UE may perform an SDT procedure based on the CG resources (in the RRC_INACTIVE state) according to the CG configuration (e.g., configured in action 306). For example, the UE may transmit UL data (e.g., small data) via the CG resource (during the SDT procedure).

In action 310, subsequent data transmission may be performed. The subsequent data transmission may be the transmission of multiple UL and/or DL packets as part of the SDT procedure and without transitioning to the RRC_CONNECTED state (e.g., the UE is still in the RRC_INACTIVE state). The UE may monitor a PDCCH via a specific RNTI (e.g., C-RNTI, CS-RNTI, and/or an SDT RNTI) on a search space (e.g., configured by a CG configuration) to receive the dynamic scheduling for UL and/or DL new transmission and/or the corresponding retransmission. The UE may monitor a PDCCH via the specific RNTI to receive the dynamic scheduling for the retransmission of CG. The UE may also perform subsequent data transmission via a CG resource according to the CG configuration (e.g., configured in action 306).

In action 312, the NW may send an RRC release message (with a suspend configuration (suspendconfig) or without suspendconfig) to keep the UE in the RRC_INACTIVE state or move the UE to the RRC_IDLE state. In another example, the NW may send an RRC resume message to move the UE to the RRC_CONNECTED state. Once the RRCRelease message (with suspendConfig IE) is received, the UE may terminate the SDT procedure based on the RRCRelease message, and/or stop monitoring the specific RNTI, and/or stay in the RRC_INACTIVE state.

Figure 4:
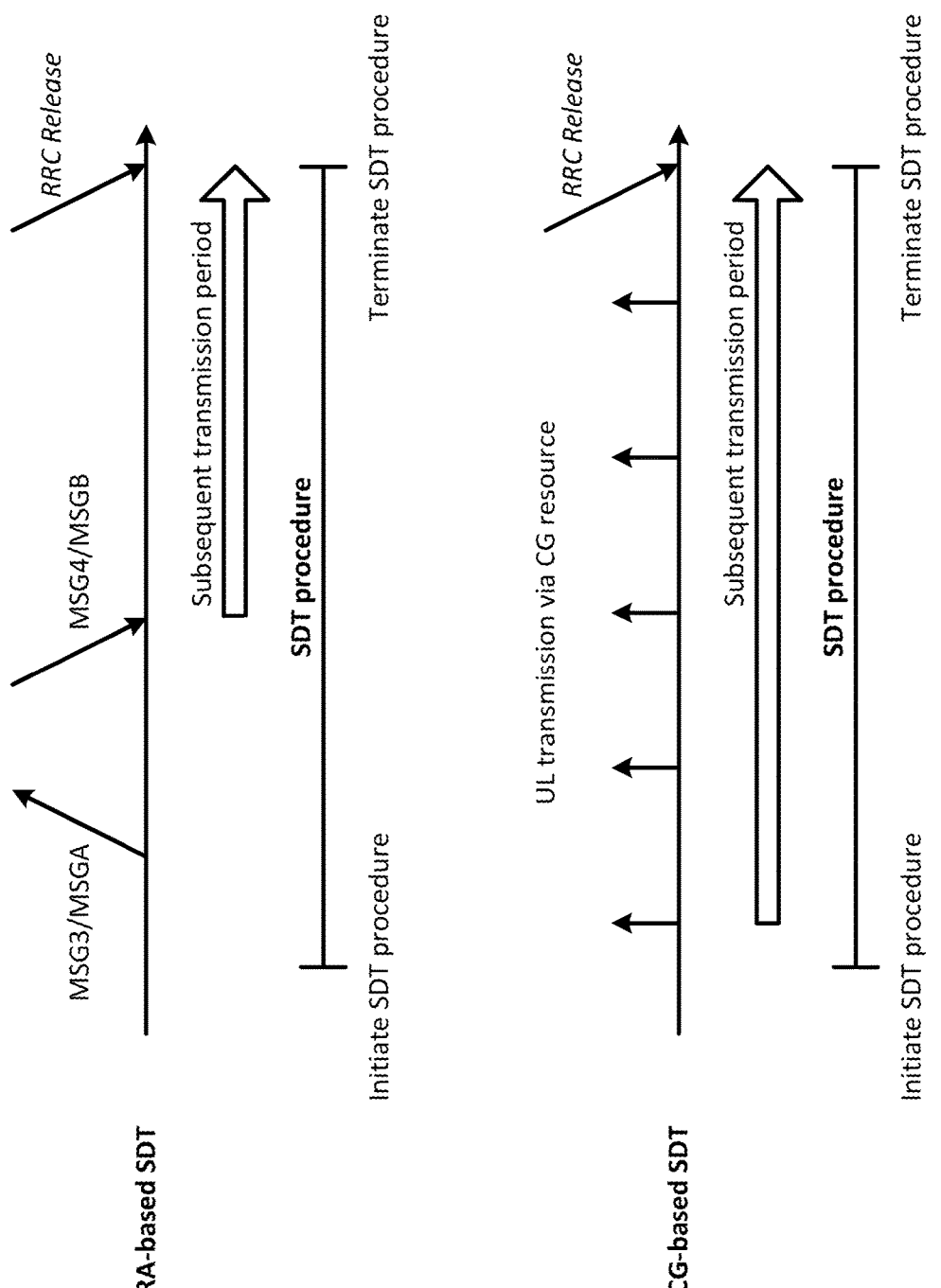
FIG. 4 is a timing diagram that illustrates examples of subsequent transmission periods for an RA-based SDT procedure and a CG-based SDT procedure, according to an example implementation of the present disclosure.

FIG. 4 is a timing diagram that illustrates examples of subsequent transmission periods (or subsequent transmission phases) for an RA-based SDT procedure and a CG-based SDT procedure, according to an example implementation of the present disclosure.

In some implementations, the subsequent transmission period may be determined as a time period during an (RA-based and/or CG-based) SDT procedure. For example, the subsequent transmission period may be a time period while the SDT procedure is ongoing. For example, the subsequent transmission period may be a time period while/after a CG configuration is configured/initiated (and the CG configuration is not released).

In some implementations, the subsequent transmission period may be determined as being started when/after the UE initiates an SDT procedure.

In some implementations, the subsequent transmission period may be determined as being started when/after the UE considers a contention resolution is successful for an RA procedure and/or after the UE considers the RA procedure is successfully completed. The RA procedure may be an RA-based SDT. The RA procedure may be initiated for SDT.

In some implementations, the subsequent transmission period may be determined as being started when/after the CG configuration is configured/(re-)initialized. For example, the CG configuration may contain a parameter which is used to indicate SDT scheduling.

In some implementations, the subsequent transmission period may be determined as being started when/after the CG configuration is considered as valid.

In some implementations, the subsequent transmission period may be determined as being started when/after the UE transmits a UL message. For example, the UL message may be transmitted via MSG1/MSG3/MSGA/CG resource/ UL resource scheduled by MSG2/MSGB/MSG4 (during the SDT procedure) or on the UL resource being (pre-)configured as part of an SDT configuration. For example, the UL message may include an RRC resume request message (e.g., RRCResumeRequest, RRCResumeRequest1, and/or a CCCH message for SDT). The UL message may include small data (e.g., UL data associated with a specific SRB/ DRB/LCH for SDT). The UL message may include a MAC CE (e.g., BSR MAC CE).

In some implementations, the subsequent transmission period may be determined as being started when/after the UE receives a response from the NW. For example, the response may be a MSG2/MSG4/MSGB and/or a response for a UL transmission via the CG resource. For example, the response may be used for contention resolution, e.g., for an RA procedure. For example, the response may include an (HARQ/RRC) ACK/NACK message, and/or DFI, e.g., for (the first) UL transmission via the CG resource. For example, the response may contain a UL grant/DL assignment for a new transmission/retransmission. The response may be a PDCCH addressed to an RNTI (e.g., a C-RNTI, a CS-RNTI, a dedicated RNTI, an RNTI for SDT, and/or an RNTI for CG). For example, the response may indicate a UL grant for a new transmission for the HARQ process used for the transmission of a UL transmission for small data (e.g., the UL message). For example, the response may include a specific command, e.g., a TA command MAC CE. For example, the response may include RRCResume, RRC-Setup, RRCRelease, RRCRelease with SuspendConfig, RRCReestablishment, RRCReconfiguration, and/or RRCReject, etc.

In some implementations, the subsequent transmission period (and/or the SDT procedure) may be terminated/stopped when/after the SDT procedure is terminated.

In some implementations, the subsequent transmission period (and/or the SDT procedure) may be terminated/stopped when/after the CG configuration is released/suspended/cleared.

In some implementations, the subsequent transmission period (and/or the SDT procedure) may be terminated/stopped when/after the CG configuration is considered invalid.

In some implementations, the subsequent transmission period (and/or the SDT procedure) may be terminated/stopped when/after the UE receives an indication from the NW. For example, the indication may include RRCResume (RRC resume message), RRCSetup (RRC setup message), RRCRelease (RRC release message), RRCRelease with SuspendConfig, RRCReestablishment (RRC reestablishment message), and/or RRCReject (RRC reject message), etc. The indication may be a PDCCH addressed to an RNTI (e.g., a C-RNTI, a CS-RNTI, a dedicated RNTI, an RNTI for SDT, and/or an RNTI for CG). The indication may indicate to the UE to terminate the SDT procedure and/or the subsequent transmission period, e.g., based on a field of the indication. The indication may indicate to the UE to initiate an RRC procedure (e.g., RRC connection resume procedure, RRC establishment procedure, and/or RRC reestablishment procedure). The indication may indicate to the UE to switch/fallback the types for SDT, e.g., the types may be RA-based SDT, CG-based SDT, 2-step RA, 4-step RA, etc. The indication (with a specific value, e.g., TRUE or FALSE,) may be included in system information (e.g., SIB) to indicate that CG transmission in the RRC_INACTIVE state is no longer supported in the cell. For example, when the UE receives the indication (with a specific value, e.g., TRUE or FALSE), the UE may release/suspend the CG configuration(s).

In some implementations, the subsequent transmission period (and/or the SDT procedure) may be terminated/stopped when/after a timer expires. For example, the timer may be an SDT failure/problem detection timer. For example, the timer may be specifically configured for SDT. The value of the timer may be configured via an RRC release message. The value of the timer may be configured via an RRC release message with a suspend configuration. The value of the timer may be configured via a configuration for SDT. The value of the timer may be configured via an RACH configuration for SDT. The value of the timer may be configured via a CG configuration for SDT. The value of the timer may be configured via an IE, e.g., UE-TimersAndConstants. The value of the timer may be configured via system information (e.g., a SIB). For example, the timer may be a TA timer, ra-Response Window, msgB-Response Window, ra-ContentionResolutionTimer, configuredGrantTimer, cg-RetransmissionTimer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, T345, and/or a new Timer. For example, the timer may be used for monitoring a response (e.g., for ACK/NACK). The timer may include a response window. For example, the timer may be used for receiving a PDCCH/scheduling (e.g., for new transmission or retransmission) from the NW.

In some implementations, the subsequent transmission period may be terminated/stopped when/after the UE enters the RRC_IDLE state or the RRC_CONNECTED state, e.g., from the RRC_INACTIVE state.

In some implementations, the subsequent transmission period may be terminated/stopped/released when/after the UE performs cell selection/reselection.

In some implementations, the subsequent transmission period may be terminated/stopped upon abortion of connection establishment by upper layers.

In some implementations, the subsequent transmission period may be terminated/stopped upon RAN notification area (RNA) update.

In some implementations, the subsequent transmission period may be terminated/stopped when/after the UE establishes/resumes an RRC connection from the RRC_INACTIVE state on a cell that is different from the cell where the CG configuration was provided.

In some implementations, the subsequent transmission period may be terminated/stopped when/after the UE initiates an RRC re-establishment procedure. For example, the subsequent transmission period may be terminated/stopped after the UE sends an RRC reestablishment request (RRCReestablishmentRequest) to the network.

In some implementations, the subsequent transmission period may be terminated/stopped when/after the UE is indicated, by the network, to perform carrier switching (e.g., from an NUL to an SUL or vice versa).

In some implementations, the subsequent transmission period may be terminated/stopped when/after the UE is indicated, by the network, to perform (UL/DL) BWP switching.

In the subsequent transmission period, the UE may need to monitor the PDCCH, e.g., to receive a possible (DL and/or UL) scheduling from the NW. The UE may monitor the PDCCH (during the SDT procedure and/or during the subsequent transmission period) based on a search space, a CORESET, and/or an RNTI. For example, the UE may monitor the PDCCH addressed to the C-RNTI after successful completion of the RA procedure for SDT.

A Search Space (SS) described in the present disclosure may refer to a common search space or a UE-specific search space set.

In some implementations, a common search space may be configured in PDCCH-ConfigCommon. In some implementations, a common search space may include the type-1 PDCCH CSS set configured by ra-SearchSpace. In some implementations, a common search space may include the type-3 PDCCH CSS set. In some implementations, a common search space may refer to search space zero. In some implementations, a common search space may refer to a new common search space set configured via system information (e.g., SIB) or an RRC release message. In some implementations, a common search space may include the search space with parameters of the search space(s) configured in the initial BWP.

In some implementations, a UE-specific search space set may be configured via an RRC release message. In some implementations, a UE-specific search space set may be configured via MSG4/MSGB. In some implementations, a UE-specific search space set may be configured via a PDCCH configuration (PDCCH-Config). In some implementations, a UE-specific search space set may be configured via configuration(s) for SDT. In some implementations, a UE-specific search space set may refer to a search space with an ID besides 0-39. In some implementations, a search space set may be identified as a specific set for SDT.

A CORESET described in the present disclosure may be a common CORESET or a UE-specific CORESET.

In some implementations, a common CORESET may refer to CORESET 0. In some implementations, a common CORESET may be a CORESET besides CORESET 0.

In some implementations, a UE-specific CORESET may refer to a UE-specific CORESET configured via an RRC release message. In some implementations, a UE-specific CORESET configuration may refer to a UE-specific CORE-SET configured via MSG4/MSGB. In some implementations, a UE-specific CORESET configuration may refer to a UE-specific CORESET configured via the configuration(s) for SDT. In some implementations, a UE-specific CORE-SET configuration may refer to a CORESET with ID besides 0-14.

An RNTI described in the present disclosure may refer to a C-RNTI, a CS-RNTI, an RNTI for SDT, an RNTI for CG, a new RNTI other than SI-RNTI, an RA-RNTI, an MSGB-RNTI, a TC-RNTI, a P-RNTI, an INT-RNTI, an SFI-RNTI, a TPC-PUSCH-RNTI, a TPC-SRS-RNTI, a CI-RNTI, an MCS-C-RNTI, a CS-RNTI(s), and/or a PS-RNTI.

Examples of some selected terms are provided as follows.

User Equipment (UE): A UE may refer to a PHY/MAC/RLC/PDCP/SDAP/RRC/AS/NAS layer/entity. Conversely, the PHY/MAC/RLC/PDCP/SDAP/RRC/AS/NAS layer/entity may be referred to as the UE.

Network (NW): The NW may be a network node, a TRP, a cell (e.g., SpCell, PCell, PSCell, and/or SCell), an eNB, a gNB, and/or a base station (BS).

Serving Cell: A PCell, a PSCell, or an SCell (Secondary Cell). The serving cell may be an activated or a deactivated serving cell.

Special Cell (SpCell): For Dual Connectivity operation, the term Special Cell refers to the PCell of the MCG (Master Cell Group) or the PSCell of the SCG (Secondary Cell Group) depending on if the MAC entity is associated with the MCG or the SCG, respectively. Otherwise, the term Special Cell refers to the PCell.

Moreover, the terms "RA-based SDT" and "RA-SDT" may be interchangeably used in some implementations of the present disclosure. The terms "CG-based SDT" and "CG-SDT" may be interchangeably used in some implementations of the present disclosure. The terms "initiate", "trigger", "apply", "store", "perform", and "start" may be interchangeably used in some implementations of the present disclosure. The terms "terminate", "stop", "release", "suspend", "discard", "end", "complete", "abort", and "cancel" may be interchangeably used in some implementations of the present disclosure. The terms "period", "process", "phase", and "duration" may be interchangeably used in some implementations of the present disclosure. The terms "resource" and "occasion" may be interchangeably used in some implementations of the present disclosure. The terms "ongoing", "running", and "pending" may be interchangeably used in some implementations of the present disclosure.

For SDT, several RSRP thresholds may be applied by the UE for different purposes, e.g., for the selection between an SDT procedure and a non-SDT procedure, for the selection between an NUL carrier and an SUL carrier, and/or for the selection between 2-step RA type and 4-step RA type. The RSRP thresholds may be configured specifically for SDT usage. The correspondence between the new RSRP thresholds for SDT, the IEs, and the associated purposes are shown in Table 3.

TABLE 3

| New RSRP thresholds for SDT | Parameters/IEs | Purposes |
|---|---|---|
| 1 RSRP threshold for SDT selection | sdt-RSRP-Threshold | Selection between SDT and non-SDT |
| 2 RSRP threshold for carrier selection | sdt-RSRP-ThresholdSSB-SUL | Selection between NUL carrier for SDT and SUL carrier for SDT |
| 3 RSRP threshold for RA type Selection | sdt-MSGA-RSRP-Threshold | Selection between 2-step RA for SDT and 4-step RA for SDT |

RSRP Threshold for SDT Selection

In some implementations, the RSRP threshold for SDT selection may be referred to as an IE sdt-RSRP-Threshold. In some implementations, the RSRP threshold for SDT selection may be used for the UE to determine whether to perform an SDT procedure. For example, the RSRP threshold for SDT selection may be used for the selection between an SDT procedure and a non-SDT procedure.

If the RSRP of the downlink pathloss reference is higher than the RSRP threshold for SDT selection (e.g., sdt-RSRP-Threshold), the UE may initiate an SDT procedure (e.g., CG-based SDT or RA-based SDT), otherwise the UE may initiate a non-SDT procedure (e.g., an RA procedure for CCCH logical channel or an RRC connection resume procedure). An example of an RSRP threshold for SDT selection is provided in Table 4

TABLE 4

An example of RSRP threshold for SDT selection

2> if the RSRP of the downlink pathloss reference is higher than sdt-RSRP-Threshold, if configured:
3>if configured grant type 1 is configured for Small Data Transmission, and the configured grant type 1 resource is valid:
4> initiate Small Data Transmission with configured grant type 1 on the selected UL carrier;
4> indicate to the upper layer that conditions for initiating Small Data Transmission are fulfilled.
3>else if Random Access Resources are configured for Small Data Transmission:
4> initiate Random Access procedure on the selected UL carrier for Small Data Transmission;
4> indicate to the upper layer that conditions for initiating Small Data Transmission are fulfilled.

TABLE 4-continued

An example of RSRP threshold for SDT selection

3>else:
4> initiate Random Access procedure for CCCH logical channel (e.g., not
for Small Data Transmission);
2> else:
3>initiate Random Access procedure for CCCH logical channel (e.g., not
for
Small Data Transmission);

In some implementations, the RSRP threshold for SDT selection may be configured by a dedicated RRC configuration. For example, the RSRP threshold for SDT selection may be configured by an SDT configuration (e.g., sdt-Config). The UE may receive an RRC message (e.g., RRC release message with suspend configuration) including the SDT configuration. For example, the RSRP threshold for SDT selection may be configured by an RRC release message (and/or suspend configuration).

In some implementations, the RSRP threshold for SDT selection may be configured by system information (e.g., SIB1 or in 'other SI' in the NR protocols). For example, the RSRP threshold for SDT selection may be configured by a common SDT configuration (e.g., sdt-ConfigCommon). The UE may receive system information (e.g., SIB1 or in 'other SI' in the NR protocols) including the common SDT configuration. For example, the RSRP threshold for SDT selection may be a cell-specific parameter.

In some implementations, the RSRP threshold for SDT selection may be configured in an RA configuration for SDT (e.g., RACH-ConfigSDT) and/or a CG configuration for SDT (e.g., CG-SDT-Config). The UE may receive system information (e.g., SIB1 or in 'other SI' (OSI) in the NR protocols) including the RA configuration for SDT and/or the CG configuration for SDT. The UE may receive an RRC message (e.g., RRC release message with suspend configuration) including the RA configuration for SDT and/or the CG configuration for SDT.

The RSRP threshold for SDT selection may be optionally configured by the NW (e.g., the RSRP threshold for SDT selection may not be mandatorily present). In other words, the NW may determine whether to configure the RSRP threshold for SDT selection to the UE based on NW implementation. Therefore, in some implementations, the RSRP threshold for SDT selection (e.g., sdt-RSRP-Threshold) may not be configured by the NW to the UE. The configuration/IE/field for the RSRP threshold for SDT selection may be absent. If the RSRP threshold for SDT selection is not configured or is absent, the UE may not be able to perform the selection between the SDT procedure and the non-SDT procedure. A number of cases (Cases 1-1 to 1-4, described below) may be examples provided for managing the situation that the RSRP threshold for SDT selection is not configured or absent. These cases may be implemented, singly or in any combination thereof, to form a specific method.

The UE may determine whether to perform an SDT procedure or to perform a non-SDT procedure based on at least a data volume threshold for SDT (e.g., sdt-DataVolumeThreshold) and/or an RSRP threshold for SDT selection (e.g., sdt-RSRP-Threshold). In some implementations, if the data volume of the pending UL data across all logical channels configured for SDT is less than or equal to the data volume threshold for SDT and/or if the RSRP of the DL pathloss reference is higher than the RSRP threshold for SDT selection which is configured or present, the UE may perform an SDT procedure, e.g., the UE may initiate an SDT procedure (e.g., determine that conditions for initiating SDT procedure are fulfilled), initiate an SDT with CG (e.g., if CG is valid), and/or initiate an RA procedure for SDT (e.g., if CG is not valid).

In some implementations, if the data volume of the pending UL data across all logical channels configured for SDT is not less than or equal to the data volume threshold for SDT and/or if the RSRP of the DL pathloss reference is not higher than the RSRP threshold for SDT selection which is configured or present, the UE may perform a non-SDT procedure, e.g., the UE may initiate a non-SDT procedure (e.g., determine that conditions for initiating SDT procedure are not fulfilled), initiate an RA procedure for CCCH logical channel, and/or initiate an RRC connection resume procedure.

Case 1-1: Directly Select/Perform the SDT Procedure

In some implementations, if the UE determines that the RSRP threshold for SDT selection is not configured or is absent, the UE may perform an SDT procedure, e.g., the UE may initiate an SDT procedure (e.g., determine that conditions for initiating SDT procedure are fulfilled), initiate an SDT with CG (e.g., if CG is valid), and/or initiate an RA procedure for SDT (e.g., if CG is not valid).

For example, the UE may determine whether to perform an SDT procedure or to perform a non-SDT procedure based on whether the RSRP threshold for SDT selection is configured (or present) after/before the UE determines whether the data volume of the pending UL data across all logical channels configured for SDT is less than or equal to the data volume threshold for SDT. For example, the UE may initiate an SDT procedure (e.g., when determined that conditions for initiating SDT procedure are fulfilled), initiate an SDT with CG (e.g., if CG is valid), and/or initiate an RA procedure for SDT (e.g., if CG is not valid) if the RSRP threshold for SDT selection is not configured or is absent and the data volume of the pending UL data across all logical channels configured for SDT is less than or equal to the data volume threshold for SDT.

In some implementations, if the UE determines that the RSRP threshold for SDT selection is not configured or is absent, the UE may perform a CG-based SDT procedure (e.g., initiate an SDT with CG) if the CG configuration/resources is configured/valid on the selected carrier (e.g., an NUL carrier or an SUL carrier).

In some implementations, if the UE determines that the RSRP threshold for SDT selection is not configured or is absent, the UE may perform an RA-based SDT procedure (e.g., by initiating an RA procedure for SDT) if the CG configuration/resource(s) is not configured/valid on the selected carrier (e.g., an NUL carrier or an SUL carrier).

In some implementations, if the UE determines that the RSRP threshold for SDT selection is not configured or is absent, the UE may perform an SDT procedure if the SDT configuration (e.g., sdt-Config) is configured on the selected carrier (e.g., an NUL carrier or an SUL carrier), and/or is configured to be associated with an (initial) default BWP.

For example, the UE may determine that the RSRP threshold for SDT selection is not configured or is absent in a case that the RSRP threshold for SDT selection is not configured in a first configuration (which is described in the present disclosure) and/or a second configuration (which is described in the present disclosure).

Case 1-2: Apply/Use Another RSRP Threshold

In some implementations, if the UE determines that a first RSRP threshold for SDT selection is not configured or is absent (in the first configuration), the UE may apply/use a second RSRP threshold (configured in the second configuration). The UE may determine whether to perform an SDT procedure or to perform a non-SDT procedure based on the second RSRP threshold (configured in the second configuration). The UE may ignore the first RSRP threshold for SDT selection.

In some implementations, if the UE determines that a first RSRP threshold for SDT selection is configured (in the first configuration), the UE may ignore a second RSRP threshold (configured in the second configuration). For example, the UE may determine whether to perform an SDT procedure or to perform a non-SDT procedure based on the first RSRP threshold (configured in a first configuration). For example, the UE may ignore the second RSRP threshold for SDT selection.

The first configuration may be (configured by/in) at least one of the following: a dedicated SDT configuration (e.g., sdt-Config), an RRC release configuration (e.g., RRCRelease), a suspend configuration (e.g., SuspendConfig), an RA configuration for SDT (e.g., RACH-ConfigSDT), a common RA configuration for SDT (e.g., RACH-Config-CommonSDT), a CG configuration for SDT (e.g., CG-SDT-Config). The common RA configuration for SDT may include cell-specific RA parameters for SDT. The first configuration may include dedicated parameters.

The second configuration may be (configured by/in) at least one of the following: a common SDT configuration (e.g., sdt-ConfigCommon), System information (e.g., SIB1 or in 'other SI' in the NR protocols), a common RA configuration for SDT (e.g., RACH-ConfigCommonSDT), an RA configuration for SDT (e.g., RACH-ConfigSDT), a CG configuration for SDT (e.g., CG-SDT-Config), an RA configuration(s) (e.g., RACH-ConfigCommon, RACH-ConfigGeneric, RACH-ConfigDedicated, RACH-ConfigCommonTwoStepRA, and/or RACH-ConfigGenericTwoStepRA), and a common BWP UL configuration (e.g., BWP-UplinkCommon).

The common SDT configuration may include cell-specific parameters for SDT. The common RA configuration for SDT may include cell-specific RA parameters for SDT. The second configuration may include common or cell-specific parameters The first RSRP threshold for SDT selection may be, but is not limited to, an RSRP threshold for SDT selection (e.g., sdt-RSRP-Threshold).

The second RSRP threshold may be, but is not limited to, one or more of the following thresholds: RSRP threshold for SDT selection (e.g., sdt-RSRP-Threshold), rsrp-Threshold-SSB, msgA-RSRP-ThresholdSSB, rsrp-ThresholdSSB-SUL, and msgA-RSRP-Threshold.

Case 1-3: RSRP Threshold for SDT Selection May be Mandatorily Present

In some implementations, the configuration/IE/field of the RSRP threshold for SDT selection may be mandatorily present if an SDT configuration is configured. In other words, the RSRP threshold may be an information element which may be conditionally configured with/in the SDT configuration (e.g., conditional presence with "Small data transmission" in 3GPP ASN.1). In some implementations, the UE may be configured to maintain the RSRP threshold which is pre-stored in the memory (module) of the UE (e.g., "Need (M)aintain" in the 3GPP ASN.1 configuration) if the UE receives one new/updated SDT configuration without an associated RSRP threshold (which is pre-defined as 'Need M'). So, the UE may apply the new/updated SDT configuration with the maintained RSRP threshold.

In some implementations, the configuration/IE/field of the RSRP threshold for SDT selection may be mandatorily present if at least one of the CG-based SDT configuration and the RA-based SDT configuration is configured. In some implementations, at least one of the CG-based SDT configuration and the RA-based SDT configuration is mandatorily present if the configuration/IE/field of the RSRP threshold for SDT selection is configured.

In some implementations, the configuration/IE/field of the RSRP threshold for SDT selection may be mandatorily present if both of the CG-based SDT configuration and the RA-based SDT configuration are configured. In some implementations, both the CG-based SDT configuration and the RA-based SDT configuration are mandatorily present if the configuration/IE/field of the RSRP threshold for SDT selection is configured.

In some implementations, the configuration/IE/field of the RSRP threshold for SDT selection may be absent if none of the CG-based SDT configuration and the RA-based SDT configuration is configured.

In some implementations, the configuration/IE/field of the RSRP threshold for SDT selection may be mandatorily present if the data volume threshold for SDT (e.g., sdt-DataVolumeThreshold) is configured/present. In some implementations, the data volume threshold for SDT (e.g., sdt-DataVolumeThreshold) is mandatorily present if the configuration/IE/field of the RSRP threshold for SDT selection is configured. In some implementations, the UE may be configured to maintain the data volume threshold which is pre-stored in the memory module of the UE side (e.g., "Need (M)aintain" in the 3GPP ASN.1 configuration) if one UE receives one new/updated SDT configuration without an associated data volume threshold (which is pre-defined as 'Need M'). So, the UE may apply the new/updated SDT configuration with the maintained data volume threshold.

The configuration/IE/field of the RSRP threshold for SDT selection may be configured/mandatorily present in one or more of the following configurations (1) to (8):

(1) Dedicated SDT configuration (e.g., sdt-Config)

(2) Common SDT configuration (e.g., sdt-ConfigCommon)

(3) RRC release configuration (e.g., RRCRelease)

(4) Suspend configuration (e.g., SuspendConfig)

(5) System information (e.g., SIB1 or in 'other SI' in the NR protocols)

(6) RA configuration for SDT (e.g., RACH-ConfigSDT)

(7) CG configuration for SDT (e.g., CG-SDT-Config)

(8) Common RA configuration for SDT (e.g., RACH-ConfigCommonSDT). The common RA configuration for SDT may include cell-specific RA parameters for SDT.

The SDT configuration may be a dedicated SDT configuration (e.g., sdt-Config). The SDT configuration may be a common SDT configuration (e.g., sdt-ConfigCommon). The common SDT configuration may include cell-specific parameters for SDT. The SDT configuration may be configured by RRC release configuration (e.g., RRCRelease), Suspend configuration (e.g., SuspendConfig), and/or System information (e.g., SIB1 or in 'other SI' in the NR protocols).

The CG-based SDT configuration may be a CG configuration for SDT (e.g., CG-SDT-Config). The CG-based SDT configuration may be configured by ConfiguredGrantConfig.

The RA-based SDT configuration may be an RA configuration for SDT (e.g., RACH-ConfigSDT). The RA-based SDT configuration may be a Common RA configuration for SDT (e.g., RACH-ConfigCommonSDT), where the common RA configuration for SDT may include cell-specific RA parameters for SDT.

The RA-based SDT configuration may be configured for 2-step RA and/or 4-step RA.

The RA-based SDT configuration may be configured by RA configurations(s), e.g., RACH-ConfigCommon, RACH-ConfigGeneric, RACH-ConfigDedicated, RACH-Config-CommonTwoStepRA, and/or RACH-ConfigGenericT-woStepRA.

Case 1-4: Directly Select/Perform the Non-SDT Procedure

In some implementations, if the UE determines that the RSRP threshold for SDT selection is not configured or is absent, the UE may perform a non-SDT procedure, e.g., the UE may initiate a non-SDT procedure (e.g., determine that conditions for initiating an SDT procedure are not fulfilled), initiate an RA procedure for CCCH logical channel, and/or initiate an RRC connection resume procedure.

For example, the UE may determine whether to perform an SDT procedure or to perform a non-SDT procedure based on whether the RSRP threshold for SDT selection is configured (or present) after/before the UE determines that the data volume of the pending UL data across all logical channels configured for SDT is less than or equal to the data volume threshold for SDT. For example, the UE may perform a non-SDT procedure if the RSRP threshold for SDT selection is not configured or is absent and the data volume of the pending UL data across all logical channels configured for SDT is less than or equal to the data volume threshold for SDT.

For example, the UE may ignore/delete/release/keep the SDT-related configurations (e.g., Dedicated SDT configuration (e.g., sdt-Config), Common SDT configuration (e.g., sdt-ConfigCommon), Common RA configuration for SDT (e.g., RACH-ConfigCommonSDT), RA configuration for SDT (e.g., RACH-ConfigSDT), CG configuration for SDT (e.g., CG-SDT-Config)) if the UE determines to perform a non-SDT procedure.

For example, the UE may determine that the RSRP threshold for SDT selection is not configured or is absent in a case that the RSRP threshold for SDT selection is not configured in the first configuration and/or the second configuration described in the present disclosure.

RSRP Threshold for Carrier Selection

In some implementations, the RSRP threshold for carrier selection may refer to an IE sdt-RSRP-ThresholdSSB-SUL.

In some implementations, the RSRP threshold for carrier selection may be used for the selection between the NUL carrier and SUL carrier for SDT. For example, if the RSRP of the downlink pathloss reference is less than the RSRP threshold for carrier selection (e.g., sdt-RSRP-Threshold-SSB-SUL), the UE may select the SUL carrier; otherwise, the UE may select the NUL carrier. An example of an RSRP threshold for carrier selection is provided in Table 5.

TABLE 5

An example of RSRP threshold for carrier selection

2>if the Serving Cell for Small Data Transmission is configured with a supplementary uplink; and
2>if the RSRP of the downlink pathloss reference is less than sdt-RSRP-ThresholdSSB-SUL:
3 > select the SUL carrier.
2>else:
3 > select the NUL carrier.

In some implementations, the RSRP threshold for carrier selection may be configured by a dedicated RRC configuration. For example, the RSRP threshold for carrier selection may be configured by an SDT configuration (e.g., sdt-Config). The UE may receive an RRC message (e.g., RRC release message with suspend configuration) including the SDT configuration. For example, the RSRP threshold for carrier selection may be configured by an RRC release message (and/or suspend configuration).

In some implementations, the RSRP threshold for carrier selection may be configured by system information (e.g., SIB1 or in 'other SI' in the NR protocols). For example, the RSRP threshold for carrier selection may be configured by a common SDT configuration (e.g., sdt-ConfigCommon). The UE may receive system information (e.g., SIB1 or in other SI in the NR protocols) including the common SDT configuration. In some cases, the serving cell/BS may just indicate (e.g., in the SIB1 or in 'other SI' in the NR protocols) that SDT is supported and the common SDT configuration may be configured separately in other SI. The RSRP threshold for carrier selection may be a cell-specific parameter.

In some implementations, the RSRP threshold for carrier selection may be configured in an RA configuration for SDT (e.g., RACH-ConfigSDT) and/or a CG configuration for SDT (e.g., CG-SDT-Config). The UE may receive system information (e.g., SIB1 or in 'other SI' in the NR protocols) including the RA configuration for SDT and/or the CG configuration for SDT. The UE may receive an RRC message (e.g., RRC release message with suspend configuration) including the RA configuration for SDT and/or the CG configuration for SDT.

The RSRP threshold for carrier selection may be optionally configured by the NW (e.g., the RSRP threshold for carrier selection may not be mandatorily present). In other words, the NW can determine whether to configure the RSRP threshold for carrier selection to the UE by network implementation. Therefore, in some implementations, the RSRP threshold for carrier selection (e.g., sdt-RSRP-ThresholdSSB-SUL) may not be configured by the NW to the UE. For example, the configuration/IE/field for the RSRP threshold for carrier selection may be absent. If the RSRP threshold for carrier selection is not configured or is absent, the UE may not be able to perform the selection between the NUL carrier and SUL carrier for SDT. In a case that the RSRP threshold for carrier selection is not configured or absent, a number of cases (e.g., Cases 2-1 to 2-3) may be examples provided in this disclosure to solve it. These cases may be implemented singly or in any combination thereof to form a specific method.

The UE may determine whether to select the SUL carrier or the NUL carrier based on whether the Serving Cell for SDT is configured with a supplementary uplink carrier, based on whether the UE is configured with an SDT configuration associated with the normal uplink carrier, based on whether the UE is configured with an SDT configuration associated with the supplementary uplink carrier, and/or based on an RSRP threshold for carrier selection (e.g., sdt-RSRP-ThresholdSSB-SUL).

In some implementations, if the Serving Cell for SDT is configured with a supplementary uplink (SUL) carrier and/or if the RSRP of the DL pathloss reference is less than the RSRP threshold for carrier selection which is configured or present, the UE may select the SUL carrier.

In some implementations, if the Serving Cell for SDT is configured with a supplementary uplink and/or if the RSRP of the DL pathloss reference is not less than the RSRP threshold for carrier selection which is configured or present, the UE may select the NUL carrier.

In some implementations, if the Serving Cell for SDT is not configured with a supplementary uplink, the UE may select the NUL carrier.

In some implementations, if the UE is configured with SDT configuration associated with the normal uplink carrier (NUL) and/or if the RSRP of the DL pathloss reference is not less than the RSRP threshold for carrier selection which is configured or present, the UE may select the NUL carrier.

In some implementations, if the UE is not configured with an SDT configuration associated with the normal uplink carrier (NUL) and/or if the RSRP of the DL pathloss reference is less than the RSRP threshold for carrier selection which is configured or present, the UE may select the SUL carrier.

In some aspects of the present disclosure, an NUL carrier described in the present disclosure may refer to an NUL carrier for SDT. In some aspects of the present disclosure, an SUL carrier described in the present disclosure may refer to an SUL carrier for SDT. In some aspects of the present disclosure, an NUL carrier described in the present disclosure may refer to an NUL carrier configured with a specific BWP on which the UE can perform SDT (e.g., an initial BWP, a default BWP, an SDT-specific BWP, etc.). In some aspects of the present disclosure, an SUL carrier described in the present disclosure may refer to an SUL carrier configured with a specific BWP on which the UE can perform SDT (e.g., an initial BWP, a default BWP, an SDT-specific BWP, etc.).

Case 2-1: Directly Select NUL or SUL Carrier

In some implementations, if the UE determines that the RSRP threshold for carrier selection is not configured or is absent, the UE may select the NUL carrier as the UL carrier for transmission. In some implementations, if the UE determines that the RSRP threshold for carrier selection is not configured or is absent, the UE may select the SUL carrier as the UL carrier for transmission. In some implementations, if the UE determines that the RSRP threshold for carrier selection is not configured or is absent, the UE may determine whether to select the NUL carrier or the SUL carrier based on whether the NUL carrier and/or the SUL carrier is configured with a specific BWP on which the UE can perform SDT, e.g., an initial BWP, a default BWP, an SDT-specific BWP, etc. In some implementations, if the UE determines that the RSRP threshold for carrier selection is not configured or is absent, the UE may determine whether to select the NUL carrier or the SUL carrier based on whether the NUL carrier and/or the SUL carrier is configured with at least one of the RA-based SDT configuration and/or CG-based SDT configuration. In some implementations, the UE may determine whether to select the NUL carrier or the SUL carrier based on whether the NUL carrier and/or the SUL carrier is configured with a CG-based SDT configuration. For example, if the UE determines that the RSRP threshold for carrier selection is not configured or is absent, the UE may determine whether to select the NUL carrier or the SUL carrier based on whether the NUL carrier and/or the SUL carrier is configured with a CG-based SDT configuration.

For example, the UE may select the NUL carrier if the NUL carrier is configured with a CG-based SDT configuration/resource (and the SUL carrier is not configured with a CG-based SDT configuration/resource). For example, the UE may select the SUL carrier if the SUL carrier is configured with a CG-based SDT configuration/resource (and the NUL carrier is not configured with a CG-based SDT configuration/resource). For example, the UE may select the NUL carrier if both the NUL carrier and the SUL carrier are configured with a CG-based SDT configuration/resource. For example, the UE may select the SUL carrier if both the NUL carrier and the SUL carrier are configured with a CG-based SDT configuration/resource.

In some implementations, the UE may determine whether to select the NUL carrier or the SUL carrier based on whether the NUL carrier and/or the SUL carrier is configured with an RA-based SDT configuration/resource. For example, if the UE determines that the RSRP threshold for carrier selection is not configured or is absent, the UE may determine whether to select the NUL carrier or the SUL carrier based on whether the NUL carrier and/or the SUL carrier is configured with an RA-based SDT configuration.

For example, the UE may select the NUL carrier if the NUL carrier is configured with an RA-based SDT configuration/resource (and the SUL carrier is not configured with an RA-based SDT configuration/resource). For example, the UE may select the SUL carrier if the SUL carrier is configured with an RA-based SDT configuration/resource (and the NUL carrier is not configured with an RA-based SDT configuration/resource). For example, the UE may select the NUL carrier if both the NUL carrier and the SUL carrier are configured with an RA-based SDT configuration/resource. For example, the UE may select the SUL carrier if both the NUL carrier and the SUL carrier are configured with an RA-based SDT configuration/resource.

In some implementations, the UE may determine whether to select the NUL carrier or the SUL carrier based on whether the NUL carrier and/or the SUL carrier is configured with a CG-based SDT configuration first. If the NUL carrier and/or the SUL carrier is not configured with a CG-based SDT configuration, then the UE may determine whether to select the NUL carrier or the SUL carrier based on whether the NUL carrier and/or the SUL carrier is configured with an RA-based SDT configuration.

The CG-based SDT configuration may be a CG configuration for SDT (e.g., CG-SDT-Config). The CG-based SDT configuration may be configured by ConfiguredGrantConfig.

The RA-based SDT configuration may be an RA configuration for SDT (e.g., RACH-ConfigSDT). The RA-based SDT configuration may be a Common RA configuration for SDT (e.g., RACH-ConfigCommonSDT). The RA-based SDT configuration may be configured for a 2-step RA and/or a 4-step RA.

The RA-based SDT configuration may be configured by one or more RA configurations including, e.g., RACH-ConfigCommon, RACH-ConfigGeneric, RACH-ConfigDedicated, RACH-ConfigCommonTwoStepRA, and/or RACH-ConfigGenericTwoStepRA.

For example, the UE may determine that the RSRP threshold for carrier selection is not configured or is absent in a case that the RSRP threshold for carrier selection is not configured in the first configuration and/or the second configuration.

Case 2-2: Apply/Use Another RSRP Threshold

In some implementations, if the UE determines that a first RSRP threshold for carrier selection is not configured or is absent (in the first configuration), the UE may apply/use a second RSRP threshold (configured in the second configuration). For example, the UE may determine whether to select the NUL carrier or the SUL carrier based on the second RSRP threshold (configured in the second configuration). For example, the UE may ignore the first RSRP threshold for carrier selection.

In some implementations, if the UE determines that a first RSRP threshold for carrier selection is configured (in the first configuration), the UE may ignore a second RSRP threshold (configured in the second configuration). For example, the UE may determine whether to select the NUL carrier or the SUL carrier based on the first RSRP threshold (configured in the first configuration), no matter whether the second RSRP threshold is configured or not. For example, the UE may ignore the second RSRP threshold for UL carrier selection.

In some implementations, the first configuration described in the present disclosure may be (configured by/in) one or more of the following configurations (1) to (6):

(1) Dedicated SDT configuration (e.g., sdt-Config);

(2) RRC release configuration (e.g., RRCRelease);

(3) Suspend configuration (e.g., SuspendConfig);

(4) RA configuration for SDT (e.g., RACH-ConfigSDT);

(5) Common RA configuration for SDT (e.g., RACH-ConfigCommonSDT), where the common RA configuration for SDT may include cell-specific RA parameters for SDT; and (6) CG configuration for SDT (e.g., CG-SDT-Config).

In some implementations, the first configuration may include dedicated parameters.

In some implementations, the second configuration described in the present disclosure may be (configured by/in) one or more of the following configurations (1) to (7):

(1) Common SDT configuration (e.g., sdt-ConfigCommon). The common SDT configuration may include cell-specific parameters for SDT;

(2) System information (e.g., SIB1 or in 'other SI' in the NR protocols);

(3) Common RA configuration for SDT (e.g., RACH-ConfigCommonSDT), where the common RA configuration for SDT may include cell-specific RA parameters for SDT;

(4) RA configuration for SDT (e.g., RACH-ConfigSDT);

(5) CG configuration for SDT (e.g., CG-SDT-Config);

(6) RA configurations(s) (e.g., RACH-ConfigCommon, RACH-ConfigGeneric,RACH-ConfigDedicated, RACH-ConfigCommonTwoStepRA, and/or RACH-ConfigGenericTwoStepRA); and (7) Common BWP UL configuration (e.g., BWP-Uplink-Common).

In some implementations, the second configuration may include common or cell-specific parameters.

In some implementations, the first RSRP threshold for carrier selection, as described in the present disclosure, may refer to an RSRP threshold for carrier selection (e.g., sdt-RSRP-ThresholdSSB-SUL).

In some implementations, the second RSRP threshold described in the present disclosure may refer to one or more of the following thresholds (1) to (5):

(1) RSRP threshold for carrier selection (e.g., sdt-RSRP-ThresholdSSB-SUL);

(2) rsrp-ThresholdSSB;

(3) msgA-RSRP-ThresholdSSB;

(4) rsrp-ThresholdSSB-SUL; and (5) msgA-RSRP-Threshold.

Case 2-3: RSRP Threshold for Carrier Selection may be Mandatorily Present

In some implementations, the configuration/IE/field of the RSRP threshold for carrier selection (e.g., sdt-RSRP-ThresholdSSB-SUL) may be mandatorily present if the Serving Cell (for SDT) is configured with at least one supplementary uplink (SUL).

In some implementations, the configuration/IE/field of the RSRP threshold for carrier selection may be mandatorily present if at least one of sdt-DataVolumeThreshold and sdt-RSRP-Threshold is configured. In some implementations, at least one of sdt-Data VolumeThreshold and sdt-RSRP-Threshold is mandatorily present if the configuration/IE/field of the RSRP threshold for carrier selection is configured. In some implementations, the configuration/IE/field of the RSRP threshold for carrier selection may be mandatorily present if both of sdt-DataVolumeThreshold and sdt-RSRP-Threshold are configured. In some implementations, both of sdt-DataVolumeThreshold and sdt-RSRP-Threshold are mandatorily present if the configuration/IE/field of the RSRP threshold for carrier selection is configured.

In some implementations, the configuration/IE/field of the RSRP threshold for carrier selection may be mandatorily present if at least one of the CG-based SDT configuration and the RA-based SDT configuration is configured in/for/associated with the SUL carrier (and/or at least one of the CG-based SDT configuration and the RA-based SDT configuration is configured in/for/associated with the NUL carrier). In some implementations, at least one of the CG-based SDT configuration and the RA-based SDT configuration is mandatorily present in/for/associated with the SUL carrier (and/or at least one of the CG-based SDT configuration and the RA-based SDT configuration is mandatorily present in/for/associated with the NUL carrier) if the configuration/IE/field of the RSRP threshold for carrier selection is configured.

In some implementations, the configuration/IE/field of the RSRP threshold for carrier selection may be mandatorily present if both the CG-based SDT configuration and the RA-based SDT configuration are configured in/for/associated with the SUL carrier (and/or both the CG-based SDT configuration and the RA-based SDT configuration are configured in/for/associated with the NUL carrier). In some implementations, both the CG-based SDT configuration and the RA-based SDT configuration are mandatorily present in/for/associated with the SUL carrier (and/or both the CG-based SDT configuration and the RA-based SDT configuration are mandatorily present in/for/associated with the NUL carrier) if the configuration/IE/field of the RSRP threshold for carrier selection is configured.

In some implementations, the configuration/IE/field of the RSRP threshold for carrier selection may be absent if the Serving Cell (for SDT) is not configured with a supplementary uplink.

In some implementations, the configuration/IE/field of the RSRP threshold for carrier selection may be absent if none of the CG-based SDT configuration and the RA-based SDT configuration is configured in/for/associated with the SUL carrier (and/or none of the CG-based SDT configuration and the RA-based SDT configuration is configured in/for the NUL carrier).

In some implementations, the configuration/IE/field of the RSRP threshold for carrier selection may be configured or mandatorily present in one or more of the following configurations (1) to (8):

(1) Dedicated SDT configuration (e.g., sdt-Config);

(2) Common SDT configuration (e.g., sdt-ConfigCommon);

(3) RRC release configuration (e.g., RRCRelease);

(4) Suspend configuration (e.g., SuspendConfig);

(5) System information (e.g., SIB1 or in 'other SI' in the NR protocols);

(6) RA configuration for SDT (e.g., RACH-ConfigSDT);

(7) CG configuration for SDT (e.g., CG-SDT-Config); and (8) Common RA configuration for SDT (e.g., RACH-ConfigCommonSDT), where the common RA configuration for SDT may include cell-specific RA parameters for SDT.

RSRP Threshold for RA Type Selection

In some implementations, the RSRP threshold for RA type selection may be referred to as an IE sdt-MSGA-RSRP-Threshold. In some implementations, the RSRP threshold for RA type selection may be used for the selection between 2-step RA type for SDT and 4-step RA type for SDT, e.g., when both 2-step and 4-step RA type Random Access Resources for SDT are configured in the UL BWP.

For example, if the UE selects the 2-step RA type for SDT, the UE may set the parameter, RA_TYPE, to 2-stepSDT-RA. For example, if the UE selects the 4-step RA type for SDT, the UE may set the RA_TYPE to 4-stepSDT-RA. For example, if the UE selects the 2-step RA type (not for SDT), the UE may set the RA_TYPE to 2-step-RA. For example, if the UE selects the 4-step RA type (not for SDT), the UE may set the RA_TYPE to 4-step-RA. An example of an RSRP threshold for RA type selection is provided in Table 6.

TABLE 6

An example of RSRP threshold for RA type selection

1> if the Random Access Procedure was initiated for Small Data Transmission:
2> if the BWP selected for Random Access procedure is configured with both 2-step and 4-step RA type Random Access Resources for Small Data Transmission and the RSRP of the downlink pathloss reference is above sdt-MSGA-RSRP-Threshold, or
2> if the BWP selected for Random Access procedure is only configured with 2-step RA type Random Access Resources for Small Data Transmission (e.g., no 4-step RA type Random Access Resources for Small Data Transmission is configured):
3>set the RA TYPE to 2-stepSDT-RA.
2> else:
3>set the RA TYPE to 4-stepSDT-RA.

In some implementations, the RSRP threshold for RA type selection may be configured by a dedicated RRC configuration. For example, the RSRP threshold for RA type selection may be configured by an SDT configuration (e.g., sdt-Config). The UE may receive an RRC message (e.g., RRC release message with suspend configuration) including the SDT configuration. For example, the RSRP threshold for RA type selection may be configured by an RRC release message (with or without a suspend configuration).

In some implementations, the RSRP threshold for RA type selection may be configured by system information (e.g., SIB1 or in other SI in the NR protocols). For example, the RSRP threshold for RA type selection may be configured by a common SDT configuration (e.g., sdt-ConfigCommon). The UE may receive the system information (e.g., SIB1 or in other SI in the NR protocols) including the common SDT configuration. For example, the RSRP threshold for RA type selection may be a cell-specific parameter.

In some implementations, the RSRP threshold for RA type selection may be configured in an RA configuration for SDT (e.g., RACH-ConfigSDT). In some implementations, the RSRP threshold for RA type selection may be configured in a 2-step RA configuration for SDT (e.g., RACH-ConfigSDTTwoStepRA).

In some implementations, the RSRP threshold for RA type selection may be configured in RACH-ConfigCommon, RACH-ConfigGeneric, RACH-ConfigDedicated, RACH-ConfigCommonTwoStepRA, and/or RACH-ConfigGenericTwoStepRA.

However, the RSRP threshold for RA type selection may be optionally configured by the NW (e.g., the RSRP threshold for RA type selection may not be mandatorily present). In other words, the NW can determine whether to configure the RSRP threshold for RA type selection to the UE by NW implementation. Therefore, in some implementations, the RSRP threshold for RA type selection (e.g., sdt-MSGA-RSRP-Threshold) may not be configured by the NW to the UE. For example, the configuration/IE/field for the RSRP threshold for RA type selection may be absent. If the RSRP threshold for RA type selection is not configured or is absent, the UE may not be able to perform the selection between 2-step RA type for SDT and 4-step RA type for SDT. In a case that the RSRP threshold for RA type selection is not configured or absent, a number of cases (e.g., Cases 3-1 to 3-4) for the UE are provided in this disclosure to solve such an issue. These cases (e.g., Cases 3-1 to 3-4) in the following description may be implemented singly or in any combination thereof to form a specific method.

In some implementations, the UE may determine whether to select the 2-step RA type for SDT or to select the 4-step RA type for SDT at least based on if the BWP/Serving cell for RA procedure is configured with 2-step and/or 4-step RA type RA Resources for SDT and/or based an RSRP threshold for RA type selection (e.g., sdt-MSGA-RSRP-Threshold).

In some implementations, if the selected BWP/Serving cell/Carrier for an RA procedure is configured with both 2-step and 4-step RA type RA Resources for SDT and/or if the RSRP of the DL pathloss reference is above the RSRP threshold for RA type selection which is configured or present, the UE may select/set the 2-step RA type (for SDT) for the RA procedure, e.g., the UE may set the RA_TYPE to 2-stepSDT-RA.

In some implementations, if the selected BWP/Serving cell/Carrier for an RA procedure is only configured with 2-step RA type RA Resources for SDT (e.g., not configured with 4-step RA type RA resources for SDT), the UE may select the 2-step RA type (for SDT) for the RA procedure, e.g., the UE may set the RA_TYPE to 2-stepSDT-RA.

In some implementations, if the selected BWP/Serving cell/Carrier for an RA procedure is only configured with 4-step RA type RA Resources for SDT (e.g., not configured with 2-step RA type RA resources for SDT), the UE may select the 4-step RA type (for SDT) for the RA procedure, e.g., the UE may set the RA_TYPE to 4-stepSDT-RA.

In some implementations, if the selected BWP/Serving cell/Carrier for an RA procedure is not configured with (both) 2-step and 4-step RA type RA Resources for SDT, the UE may perform a non-SDT procedure, e.g., the UE may initiate a non-SDT procedure (e.g., in a case that the UE determines that conditions for initiating an SDT procedure are not fulfilled), initiate an RA procedure for CCCH logical channel, and/or initiate an RRC connection resume procedure.

For example, if the selected BWP/Serving cell/Carrier for an RA procedure is not configured with (both) 2-step and 4-step RA type RA Resources for SDT, the UE may select the RA type (which is not for SDT), e.g., the UE may set the RA_TYPE to 2-step-RA or set the RA_TYPE to 4-step-RA.

Case 3-1: Directly Select 4-Step RA/2-Step RA Type (for SDT or not for SDT)

In some implementations, if the UE determines that the RSRP threshold for RA type selection is not configured or is absent, the UE may select 2-step RA type for SDT. For example, the UE may set the RA_TYPE to 2-stepSDT-RA. In some implementations, if the UE determines that the RSRP threshold for RA type selection is not configured or is absent, the UE may select 4-step RA type for SDT. For example, the UE may set the RA_TYPE to 4-stepSDT-RA. In some implementations, if the UE determines that the RSRP threshold for RA type selection is not configured or is absent, the UE may select 2-step RA type (which is not for SDT). For example, the UE may set the RA_TYPE to 2-stepRA. In some implementations, if the UE determines that the RSRP threshold for RA type selection is not configured or is absent, the UE may select 4-step RA type (which is not for SDT). For example, the UE may set the RA_TYPE to 4-stepRA.

In some implementations, if the UE determines that the RSRP threshold for RA type selection is not configured or is absent, the UE may select 2-step RA type for SDT if 2-step RA type RA resources for SDT are present (and 4-step RA type RA resources for SDT are not present).

In some implementations, if the UE determines that the RSRP threshold for RA type selection is not configured or is absent, the UE may select 4-step RA type for SDT if 4-step RA type RA resources for SDT are present (and 2-step RA type RA resources for SDT are not present).

In some implementations, if the UE determines that the RSRP threshold for RA type selection is not configured or is absent, the UE may select 2-step RA type (which is not for SDT) or 4-step RA type (which is not for SDT) if both 2-step RA type RA resources for SDT and 4-step RA type RA resources for SDT are not present. For example, the UE may determine that the RSRP threshold for RA type selection is not configured or is absent in a case that the RSRP threshold for RA type selection is not configured in the first configuration and/or the second configuration.

Case 3-2: Apply/Use Another RSRP Threshold

In some implementations, if the UE determines that a first RSRP threshold for RA type selection is not configured or is absent (in the first configuration), the UE may apply/use a second RSRP threshold (configured in, e.g., the second configuration described in the disclosure). For example, the UE may determine whether to select the 2-step RA type for SDT or the 4-step RA type for SDT based on the second RSRP threshold (e.g., configured in the second configuration). For example, the UE may ignore the first RSRP threshold for RA type selection.

In some implementations, if the UE determines that a first RSRP threshold for RA type selection is configured (in the first configuration), the UE may ignore a second RSRP threshold (configured in the second configuration). For example, the UE may determine whether to select the 2-step RA type for SDT or the 4-step RA type for SDT based on the first RSRP threshold (configured in the first configuration). For example, the UE may ignore the second RSRP threshold for RA type selection.

In some implementations, the first configuration may be (configured by/in) one or more of the following configurations (1) to (6):
(1) Dedicated SDT configuration (e.g., sdt-Config);
(2) RRC release configuration (e.g., RRCRelease);
(3) Suspend configuration (e.g., SuspendConfig);
(4) RA configuration for SDT (e.g., RACH-ConfigSDT);

(5) Common RA configuration for SDT (e.g., RACH-ConfigCommonSDT), where the common RA configuration for SDT may include cell-specific RA parameters for SDT; and
(6) CG configuration for SDT (e.g., CG-SDT-Config)
The first configuration may include dedicated parameters.

In some implementations, the second configuration may be (configured by/in) one or more of the following configurations (1) to (7):
(1) Common SDT configuration (e.g., sdt-ConfigCommon), where the common SDT configuration may include cell-specific parameters for SDT;
(2) System information (e.g., SIB1 or in 'other SI' in the NR protocols);
(3) Common RA configuration for SDT (e.g., RACH-ConfigCommonSDT), where the common RA configuration for SDT may include cell-specific RA parameters for SDT;
(4) RA configuration for SDT (e.g., RACH-ConfigSDT);
(5) CG configuration for SDT (e.g., CG-SDT-Config);
(6) RA configurations(s) (e.g., RACH-ConfigCommon, RACH-ConfigGeneric, RACH-ConfigDedicated, RACH-ConfigCommonTwoStepRA, and/or RACH-ConfigGenericTwoStepRA); and
(7) Common BWP UL configuration (e.g., BWP-Uplink-Common).
The second configuration may include common or cell-specific parameters.

In some implementations, the first RSRP threshold for RA type selection may be an RSRP threshold for RA type selection for SDT (e.g., sdt-MSGA-RSRP-Threshold).

In some implementations, the second RSRP threshold may be one or more of the following thresholds (1) to (5):
(1) RSRP threshold for RA type selection for SDT (e.g., sdt-MSGA-RSRP-Threshold);
(2) rsrp-ThresholdSSB;
(3) msgA-RSRP-ThresholdSSB;
(4) rsrp-ThresholdSSB-SUL; and
(5) msgA-RSRP-Threshold.

Case 3-3: RSRP Threshold for RA Type Selection May be Mandatorily Present

In some implementations, the configuration/IE/field of the RSRP threshold for RA type selection (for SDT) may be mandatorily present if both 2-step RA type (for SDT) and 4-step RA type (for SDT) are configured in the BWP/serving cell/carrier. Otherwise, the configuration/IE/field of the RSRP threshold for RA type selection (for SDT) may be absent.

In some implementations, the configuration/IE/field of the RSRP threshold for RA type selection (for SDT) may be mandatorily present if 2-step RA type (for SDT) is configured in the BWP/serving cell/carrier. Otherwise, the configuration/IE/field of the RSRP threshold for RA type selection (for SDT) may be absent.

In some implementations, the configuration/IE/field of the RSRP threshold for RA type selection (for SDT) may be absent if 2-step RA type (for SDT) is not configured in the BWP/serving cell/carrier.

In some implementations, the configuration/IE/field of the RSRP threshold for RA type selection may be configured/mandatorily present in one or more of the following configurations (1) to (8):
(1) Dedicated SDT configuration (e.g., sdt-Config);
(2) Common SDT configuration (e.g., sdt-ConfigCommon);
(3) RRC release configuration (e.g., RRCRelease);
(4) Suspend configuration (e.g., SuspendConfig);

(5) System information (e.g., SIB1 or in 'other SI' in the NR protocols);

(6) RA configuration for SDT (e.g., RACH-ConfigSDT);

(7) CG configuration for SDT (e.g., CG-SDT-Config);

(8) Common RA configuration for SDT (e.g., RACH-ConfigCommonSDT), the common RA configuration for SDT may include cell-specific RA parameters for SDT.

Case 3-4: Directly Perform Non-SDT Procedure

In some implementations, if the UE determines that the RSRP threshold for RA type selection is not configured or is absent, the UE may perform a non-SDT procedure. For example, the UE may initiate a non-SDT procedure (e.g., in a case that the UE determines that conditions for initiating an SDT procedure are not fulfilled), initiate an RA procedure for CCCH logical channel, and/or initiate an RRC connection resume procedure.

In some implementations, the UE may determine that the RSRP threshold for RA type selection is not configured or is absent in a case that the RSRP threshold for RA type selection is not configured in the first configuration and/or the second configuration.

Combination of RSRP Thresholds

In some implementations, the UE may determine/measure the RSRP of the DL pathloss reference based on a combination of a number of following RSRP thresholds to determine how to select the SDT/non-SDT procedure, select the NUL/SUL carrier, and/or select the RA type at the same time (e.g., after/when the UE initiates an SDT procedure and/or after/when the UE determines that the data volume of the pending UL data across all logical channels configured for Small Data Transmission is less than or equal to sdt-DataVolumeThreshold). Then, after the UE completes the determination on the above-mentioned selection(s) according to one or more RSRP thresholds, the UE may start performing the SDT/non-SDT procedure based on result of the determination.

The RSRP thresholds may include one or more of the following:

(1) an RSRP threshold for SDT selection (e.g., sdt-RSRP-Threshold), (2) an RSRP threshold for carrier selection (e.g., sdt-RSRP-ThresholdSSB-SUL), and (3) an RSRP threshold for RA type selection (e.g., sdt-MSGA-RSRP-Threshold).

For example, the UE may perform the above-mentioned determination by comparing the measured RSRP of the DL pathloss reference (with the minimized/maximized value among the RSRP threshold for SDT selection) with at least one of the RSRP threshold for carrier selection and the RSRP threshold for RA type selection.

Assumptions for SDT

SDT may be supported as a baseline for RA-based SDT and CG-based SDT schemes.

A stored "configuration" in the UE Context may be used for the RLC bearer configuration.

The 2-step RACH or 4-step RACH may be applied to RA-based SDT in the RRC_INACTIVE state.

The UL small data may be sent in MSGA of a 2-step RACH and/or MSG3 of a 4-step RACH.

SDT may be configured by the network on a per-RB (e.g., SRB/DRB) basis

Data volume threshold may be used for the UE to decide whether to perform/select an SDT procedure (e.g., initiate SDT procedure, initiate RA procedure for SDT, and/or initiate SDT procedure with CG) or perform/select a non-SDT procedure (e.g., initiate RA procedure for a CCCH logical channel).

UL/DL transmission following UL SDT without transitioning to the RRC_CONNECTED state (e.g., from the RRC_INACTIVE state) may be applied.

When the UE is in the RRC_INACTIVE state, it may be possible to send one or multiple UL and DL packets as part of the same SDT procedure and without transitioning to the RRC_CONNECTED state (e.g., the UE remains in the RRC_INACTIVE state).

When the UE receives an RRC release message (with suspend configuration), the UE may perform the following actions (1) to (3):

(1) A MAC entity may be reset, and a default radio bearer configuration may be released;

(2) RLC entities for SRB1 may be re-established; and (3) SRBs and DRBs may be suspended except SRB0.

Upon initiating an SDT procedure (e.g., for the first transmission of small data), the UE may re-establish at least the PDCP entities (for SDT) and/or resume the RBs (for SDT).

The first UL message of SDT (e.g., MSG3 for 4-step RACH, MSGA payload for 2-step RACH and/or the CG transmission) may contain a CCCH message.

LCP may be used to determine the priority of at least one of the following contents (1) to (3) that may be included:

(1) Data from one or more RBs which are configured by the network for small data transmission;

(2) MAC CEs (e.g., BSR, PER, etc.); and (3) Padding bits.

The CCCH message may contain ResumeMAC-I generated using the stored security key for RRC integrity protection.

New keys may be generated using the stored security context and the NCC value received in the previous RRC release message, and these new keys may be used for generating the data of RBs that are configured for SDT.

For CG-based SDT, the configuration of CG resources for uplink small data transfer may be contained in the RRC release message.

For CG-based SDT, a TA timer (e.g., cg-SDT-TimeAlignmentTimer) for TA maintenance specified for CG-based small data transfer in the RRC_INACTIVE state may be applied. The TA timer may be configured together with the CG configuration in the RRC release message.

For CG-based SDT, the configuration of CG resources for small data transmission may be valid only in the same serving cell (e.g., the configuration of CG resources for small data transmission may be invalid if the UE camps on another cell).

For CG-based SDT, the UE may use CG-based small data transfer if at least the following criteria (1) to (3) is fulfilled:

(1) user data is smaller than the data volume threshold;

(2) CG resources are configured and valid; and (3) UE has valid TA.

For CG-based SDT, an association between CG resources and SSBs may be required for CG-based SDT.

For CG-based SDT, an SS-RSRP threshold may be configured for SSB selection. UE selects one of the SSB with SS-RSRP above the threshold and selects the associated CG resources for UL data transmission.

For CG-based SDT, CG-SDT resource configuration may be provided to UEs in the RRC_CONNECTED state by the RRC release message.

For CG-based SDT, CG resources (e.g., PUSCH resources) may be separately configured for NUL and SUL.

For CG-based SDT, an RRC release message may be used to reconfigure or release the CG-SDT configuration/resources while the UE is in the RRC_INACTIVE state.

For CG-based SDT, the subsequent data transmission may use the CG resources or DG (e.g., dynamic grant addressed to UE's C-RNTI/CS-RNTI). The C-RNTI/CS-RNTI may be the same as the previous C-RNTI/CS-RNTI or may be configured explicitly by the network.

For CG-based SDT, a TA timer (e.g., cg-SDT-TimeAlignmentTimer) may be started upon receiving the TA configuration from gNB, e.g., via an RRC release message, and may be (re)started upon reception of a TA command.

For CG-based SDT, the UE may release CG configuration/resources when TAT expires in the RRC_INACTIVE state.

For RA-based SDT, up to two preamble groups (corresponding to two different payload sizes for MSGA/MSG3) may be configured by the network.

For RA-based SDT, upon successful completion of contention resolution, the UE may monitor the C-RNTI.

For RA-based SDT, the RACH resource, e.g., (RO+ preamble combination), may be different between SDT (e.g., RA for SDT) and non-SDT (e.g., RA for CCCH or RA for RRC connection resume).

For RA-based SDT, the RRC release (RRCRelease) message may be sent at the end to terminate the SDT procedure (e.g., from RRC point of view). The RRCRelease message sent at the end of the SDT may contain the CG resource.

An RSRP threshold (e.g., sdt-RSRP-Threshold) may be used to select between SDT (e.g., initiate SDT procedure, initiate RA procedure for SDT, and/or initiate SDT procedure with CG) and non-SDT procedure (e.g., initiate RA procedure for CCCH logical channel).

For SDT, the UE may perform UL carrier selection (e.g., UL and SUL selection).

If CG-SDT resources are configured on the selected UL carrier and are valid, then CG-based SDT may be selected to be performed. Otherwise:

If 2-step RA resources (for SDT) are configured on the UL carrier and criteria to select 2-step RA (for SDT) are met, then 2-step RA type (for SDT) may be chosen, else if 4-step RA resources (for SDT) are configured on the UL carrier and criteria to select 4-step RA (for SDT) are met, then 4-step RA type may be chosen, else the UE does not perform an SDT procedure (e.g., the UE may perform RRC connection resume procedure).

If both 2-step RA (for SDT) and 4-step RA resources (for SDT) are configured on the UL carrier, RA type selection (e.g., 2-step and 4-step RA type selection) may be performed based on an RSRP threshold (e.g., sdt-MSGA-RSRP-Threshold).

Except for DRB, SRB1 and SRB2 may be configured for SDT, e.g., for carrying RRC and/or NAS messages. Upon initiating an SDT procedure and/or an RRC Resume procedure for SDT initiation (e.g., for first SDT transmission), the UE may also resume an SRB (e.g., SRB1, SRB2, and/or SRB3) that is configured for SDT, e.g., in addition to SDT DRBs that are configured for SDT.

A specific search space may be supported for monitoring the PDCCH addressed to the C-RNTI after successful completion of the RACH procedure during RA-SDT.

An RSRP threshold (e.g., sdt-RSRP-Threshold) may be used to select between an SDT and non-SDT procedure, if configured (RSRP refers to the same RSRP measured for carrier selection).

An RSRP threshold (e.g., sdt-RSRP-Threshold) to select between an SDT and non-SDT procedure may be used for both CG-SDT and RA-SDT.

An RSRP threshold (e.g., sdt-RSRP-Threshold) to select between an SDT and non-SDT procedure may be the same for both CG-SDT and RA-SDT.

An RSRP threshold for carrier selection (e.g., sdt-RSRP-ThresholdSSB-SUL) may be specific to SDT (e.g., separately configured for SDT). This may be optional for the network.

An RSRP threshold for RA type selection (sdt-MSGA-RSRP-Threshold) may be specific to SDT (e.g., separately configured for SDT).

A Data volume threshold (e.g., sdt-DataVolumeThreshold) may be the same for CG-SDT and RA-SDT.

Switching/fallback from an SDT procedure to a non-SDT procedure (e.g., RRC connection resume procedure) may be applied based on some criteria.

Switching/fallback from CG-SDT to RA-SDT may be applied based on some criteria.

UE may switch from an SDT procedure to a non-SDT procedure (e.g., RRC connection resume procedure) in the following scenarios:

Scenario 1: The UE receives an indication from the network to switch to a non-SDT procedure. For example, Network can send an RRC Resume message, and/or can send an indication in RAR/fallbackRAR/DCI to switch to a non-SDT procedure.

Scenario 2: Initial UL transmission (in MSGA/MSG3/CG resources) fails up to a configured number of times.

The UE may perform PDCP re-establishment implicitly, e.g., without an explicit indication for PDCP re-establishment from the NW, when the UE initiates an SDT procedure.

SR resources (e.g., PUCCH resources for SR) may not be configured for SDT. When the BSR is triggered by SDT data, the UE will trigger RA because SR resources are not available.

A SDT failure detection timer may be started upon initiation of an SDT procedure.

Upon SDT failure detection timer expiry, the UE may transition to the IDLE state and/or attempt RRC connection setup.

CG resources for SDT may be configured at the same time on NUL and SUL.

The UE may start a timer after an UL (re)transmission, e.g., for CG-SDT.

CG resources for SDT may be configured on BWPs other than an initial BWP.

CG resources per CG configuration may be associated with a set of SSB(s) configured by explicit signaling.

The specific search space may be a common search space to the UEs performing RA-SDT.

A UE-specific search space may be configured for UEs performing CG-SDT.

The UE may monitor paging after the UE initiates SDT for system information change and/or PWS.

For CG-based SDT, the SSB-to-PUSCH resource mapping within the CG configuration may be implicitly defined.

The ordering of the SSB and CG PUSCH resources may be captured in the RAN1 spec (e.g., TS 38.213).

A PUSCH resource may refer to a transmission occasion and a DMRS resource used for PUSCH transmission The SSB subset for RSRP based TA validation may be determined at least based on a configured absolute RSRP threshold. The SSB subset may be:

within a set of SSBs configured per CG configuration, within a set of SSBs configured for all CG configurations, within a set of all SSBs actually transmitted as indicated in SIB1 or in 'other SI' in the NR protocols, and/or the highest N SSBs that are measured to derive the subset for a UE across all CG configurations.

Random Access (RA) Procedure

Two types of RA procedure may be supported: 4-step RA type with MSG1 and 2-step RA type with MSGA. Both types of RA procedure support contention-based random access (CBRA) and contention-free random access (CFRA).

The UE may select the type of random access at initiation of the random access procedure based on network configuration. For example, when CFRA resources are not configured, an RSRP threshold is used by the UE to select between 2-step RA type and 4-step RA type. For example, when CFRA resources for 4-step RA type are configured, the UE performs random access with 4-step RA type. For example, when CFRA resources for 2-step RA type are configured, the UE performs random access with 2-step RA type.

The network may not configure CFRA resources for 4-step and 2-step RA types at the same time for a Bandwidth Part (BWP). CFRA with 2-step RA type is only supported for handover.

The MSG1 of the 4-step RA type may include a preamble on a PRACH. After MSG1 transmission, the UE monitors for a response from the network within a configured window. For CFRA, a dedicated preamble for MSG1 transmission is assigned by the network and upon receiving random access response from the network, the UE ends the random access procedure. For CBRA, upon reception of the random access response, the UE sends MSG3 using the UL grant scheduled in the response and monitors contention resolution. If contention resolution is not successful after MSG3 (re)transmission(s), the UE returns to MSG1 transmission.

The MSGA of the 2-step RA type includes a preamble on a PRACH and a payload on a PUSCH. After MSGA transmission, the UE monitors for a response from the network within a configured window. For CFRA, a dedicated preamble and a PUSCH resource are configured for MSGA transmission and upon receiving the network response, the UE ends the random access procedure. For CBRA, if contention resolution is successful upon receiving the network response, the UE ends the random access procedure; while if a fallback indication is received in MSGB, the UE performs MSG3 transmission using the UL grant scheduled in the fallback indication and monitors contention resolution. If contention resolution is not successful after MSG3 (re)transmission(s), the UE returns to MSGA transmission.

If the random access procedure with 2-step RA type is not completed after a number of MSGA transmissions, the UE can be configured to switch to CBRA with 4-step RA type.

Configured Grant (CG)

With configured grants, the gNB can allocate uplink resources for the initial HARQ transmissions to UEs. Two types of configured uplink grants are defined:

With Type 1 (e.g., CG type 1), RRC directly provides the configured uplink grant (including the periodicity).

With Type 2 (e.g., CG type 2), RRC defines the periodicity of the configured uplink grant while a PDCCH addressed to CS-RNTI can either signal and activate the configured uplink grant, or deactivate it; e.g., a PDCCH addressed to CS-RNTI indicates that the uplink grant can be implicitly reused according to the periodicity defined by RRC, until deactivated.

The NW and/or RRC may configure the following parameters (1) to (5) when the CG Type 1 is configured:

(1) cs-RNTI: CS-RNTI for retransmission;

(2) periodicity: periodicity of the configured grant Type 1;

(3) timeDomainOffset: Offset of a resource with respect to SFN=0 in time domain;

(4) timeDomainAllocation: Allocation of configured uplink grant in time domain, which contains startSymbolAndLength (e.g., SLIV in TS 38.214); and (5) nrofHARQ-Processes: the number of HARQ processes for configured grant.

Upon configuration of a CG Type 1 for a Serving Cell by upper layers, the UE (or MAC entity) may store the uplink grant provided by the upper layers as a configured uplink grant (for the indicated Serving Cell), and/or (re-)initialize the configured uplink grant to start in the symbol according to timeDomainOffset and S (derived from SLIV as specified in TS 38.214), and to reoccur with periodicity.

RRC Connection Resume Procedure

The purpose of the RRC connection resume procedure is to resume a suspended RRC connection, including resuming SRB(s) and DRB(s) or perform an RNA update.

The UE initiates the RRC connection resume procedure when upper layers or AS (when responding to RAN paging, upon triggering RNA updates while the UE is in the RRC_INACTIVE state) requests the resume of a suspended RRC connection.

The suspension of the RRC connection may be initiated by the network. When the RRC connection is suspended, the UE stores the UE Inactive AS context and any configuration received from the network, and transitions to the RRC_INACTIVE state. The RRC message to suspend the RRC connection may be integrity protected and ciphered.

The resumption of a suspended RRC connection may be initiated by upper layers when the UE needs to transition from the RRC_INACTIVE state to the RRC_CONNECTED state or by RRC layer to perform an RNA update or by RAN paging from NG-RAN. When the RRC connection is resumed, the network configures the UE according to the RRC connection resume procedure based on the stored UE Inactive AS context and any RRC configuration received from the network. The RRC connection resume procedure re-activates AS security and re-establishes SRB(s) and DRB(s).

In response to a request to resume the RRC connection, the network may resume the suspended RRC connection and send UE to the RRC_CONNECTED state or reject the request to resume and send the UE to the RRC_INACTIVE state (with a wait timer), or directly re-suspend the RRC connection and send the UE to the RRC_INACTIVE state, or directly release the RRC connection and send the UE to the RRC_IDLE state, or instruct the UE to initiate NAS-level recovery (in this case, the network sends an RRC setup message).

The details of the RRC connection resume procedure can be found in 3GPP TS 38.331 V16.4.1.

Supplementary Uplink

In conjunction with a UL/DL carrier pair (Frequency Division Duplex (FDD) band) or a bidirectional carrier (Time Division Duplex (TDD) band), a UE may be configured with a Supplementary Uplink (SUL). SUL differs from the aggregated uplink in that the UE may be scheduled to transmit either on the supplementary uplink or on the uplink of the carrier being supplemented, but not on both at the same time.

In case of a Supplementary Uplink, the UE is configured with 2 ULs for one DL of the same cell, and uplink transmissions on those two ULs are controlled by the network to avoid overlapping PUSCH/PUCCH transmissions in time. Overlapping transmissions on a PUSCH are avoided through scheduling while overlapping transmissions on a PUCCH are avoided through configuration (PUCCH can only be configured for only one of the 2 ULs of the cell). In addition, initial access is supported in each of the uplinks.

Figure 5:
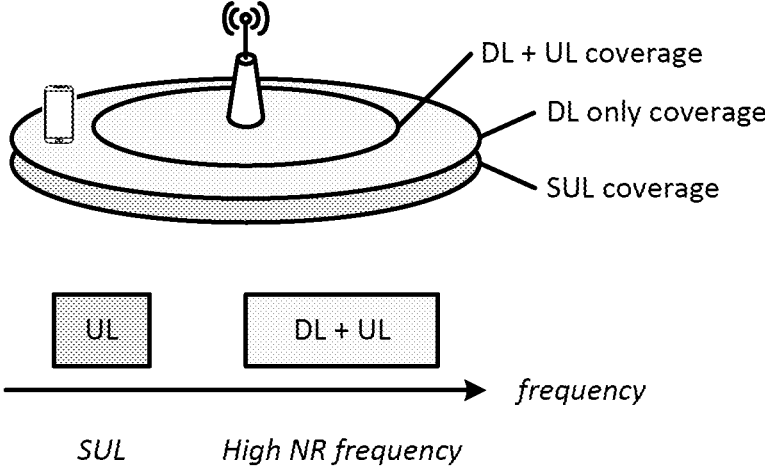
FIG. 5 is a diagram illustrating a configured SUL for a UE being associated with two ULs and one DL of the same cell, according to an example implementation of the present disclosure.

To improve UL coverage for high frequency scenarios, an SUL can be configured. FIG. 5 is a diagram illustrating a configured SUL for a UE being associated with two ULs and one DL of the same cell, according to an example implementation of the present disclosure.

Figure 6:
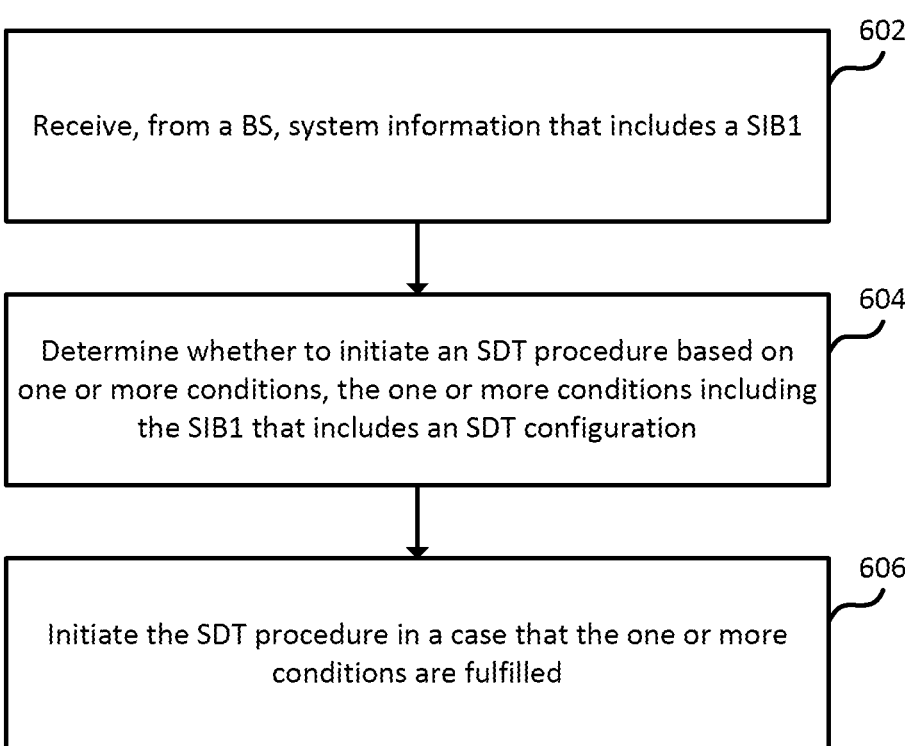
FIG. 6 is a flowchart of a method for a UE for performing SDT, according to an example implementation of the present disclosure.

FIG. 6 is a flowchart of a method 600 for a UE for performing SDT according to an example implementation of the present disclosure. Although actions 602, 604, and 606 are illustrated as separate actions represented as independent blocks in FIG. 6, these separately illustrated actions should not be construed as necessarily order-dependent. The order in which the actions are performed in FIG. 6 is not intended to be construed as a limitation, and any number of the disclosed blocks may be combined in any order to implement the method, or an alternate method. Moreover, each of actions 602, 604, and 606 may be performed independently of other actions, and can be omitted in some implementations of the present disclosure.

In action 602, the UE may receive, from a BS, system information that includes a SIB 1.

In action 604, the UE may determine whether to initiate an SDT procedure based on one or more conditions. For example, the one or more conditions may include: the SIB1 including an SDT configuration.

In action 606, the UE may initiate the SDT procedure in a case that the one or more conditions are fulfilled. For example, the UE may initiate the SDT procedure in a case that the received SIB1 includes the SDT configuration. On the other hand, the UE may not initiate the SDT procedure in a case that none of the one or more conditions is fulfilled.

In some implementations, the SDT procedure may refer to a procedure that allows data transmission while the UE is remaining in an RRC inactive (RRC_INACTIVE) state. In some implementations, the SDT procedure may include one or more actions included in action 106 of FIG. 1.

In some implementations, the SDT configuration may include an SDT-specific RSRP threshold. Given this, the one or more conditions may further include: an RSRP of a DL pathloss reference signal is higher than the SDT-specific RSRP threshold.

In some implementations, the SDT-specific RSRP threshold may be determined by (or may refer to) an IE denoted as sdt-RSRP-Threshold.

In some implementations, the SDT configuration may be determined by (or may refer to) an IE denoted as sdt-ConfigCommon.

In some implementations, the SDT procedure may be initiated when the UE operates in an RRC inactive (RRC_INACTIVE) state.

In some implementations, the UE may further receive, from the BS, an RA configuration that includes an RSRP threshold and select (one of) an NUL carrier or an SUL carrier as a UL carrier for the SDT procedure based on the RSRP threshold. That is, the UE may perform UL carrier selection for SDT based on the RSRP threshold included in the RA configuration. For example, the UE may select the SUL carrier as the UL carrier for the SDT procedure in a case that an RSRP of a DL pathloss reference signal is less than the RSRP threshold. The UE may determine whether a serving cell for the SDT procedure is configured with the SUL and select the NUL carrier as the UL carrier for the SDT procedure in a case that the serving cell is not configured with an SUL.

In some implementations, the RSRP threshold is determined by (or may refer to) an IE denoted as rsrp-ThreshholdSSB-SUL. In some implementations, the RSRP threshold may have a same value for all BWPs of a (serving) cell.

According to method 600, the UE may determine whether an SDT procedure can be initiated at least based on the content of the received SIB1. From a BS's perspective, it can control (e.g., enable/disable) one or more UEs to (or not to) initiate an SDT procedure by simply including (or not including) an SDT configuration in the SIB1 (which is system information broadcast to one or more UEs), resulting in increased scheduling flexibility of the communication system and improved performance of SDT.

Figure 7:
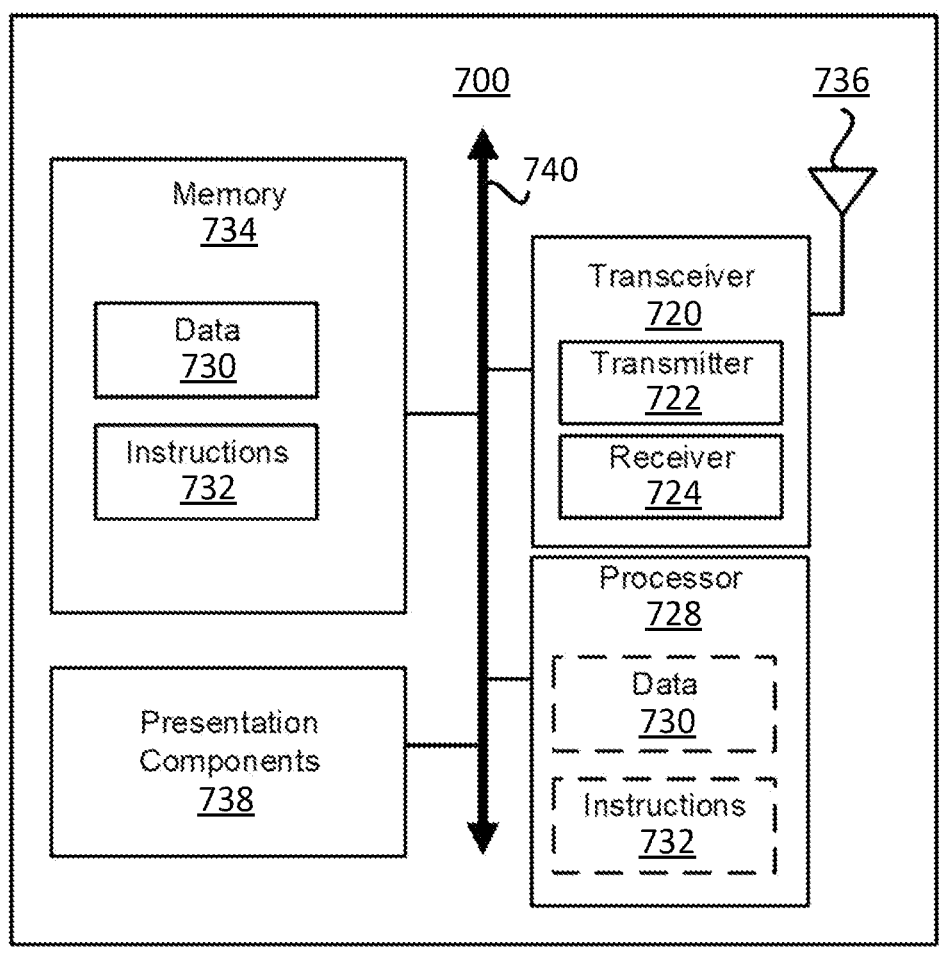
FIG. 7 is a block diagram illustrating a node for wireless communication, according to an example implementation of the present disclosure.

FIG. 7 is a block diagram illustrating a node 700 for wireless communication according to an example implementation of the present disclosure. As illustrated in FIG. 7, a node 700 may include a transceiver 720, a processor 728, a memory 734, one or more presentation components 738, and at least one antenna 736. The node 700 may also include a radio frequency (RF) spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable, and flexibly usable subframes and slot formats. The transceiver 720 may be configured to receive data and control channels.

The node 700 may include a variety of computer-readable media. Computer-readable media may be any available media that may be accessed by the node 700 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof. Example memory may include solid-state memory, hard drives, optical-disc drives, etc. As illustrated in FIG. 7, the memory 734 may store a computer-readable and/or computer-executable program 732 (e.g., software codes or a set of instructions) that are configured to, when executed, cause the processor 728 to perform various functions disclosed herein, for example, with reference to FIGS. 1 through 6. Alternatively, the program 732 may not be directly executable by the processor 728 but may be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory. The processor 728 may process the data 730 and the program 732 received from the memory 734, and information transmitted and received via the transceiver 720, the baseband communications module, and/or the network communications module. The processor 728 may also process information to send to the transceiver 720 for transmission via the antenna 736 to the network communications module for transmission to a Core Network (CN).

One or more presentation components 738 may present data indications to a person or another device. Examples of presentation components 738 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for Small Data Transmission (SDT), the method comprising:
    receiving, from a Base Station (BS), system information that includes a System Information Block 1 (SIB1);
    initiating an SDT procedure in response to determining that a plurality of conditions is satisfied, the plurality of conditions comprising:
        the SIB1 including an SDT configuration, and
        an SDT-specific Reference Signal Received Power (RSRP) threshold being absent from the SDT configuration;
    in response to initiating the SDT procedure, determining whether a serving cell for the SDT procedure is configured with a Supplementary Uplink (SUL) carrier; and selecting a Normal Uplink (NUL) carrier as an Uplink (UL) carrier for the SDT procedure in response to determining that the serving cell is not configured with the SUL carrier.

2. The method of claim 1, wherein the SDT-specific RSRP threshold corresponds to an Information Element (IE) denoted as sdt-RSRP-Threshold.

3. The method of claim 1, wherein the SIB1 is determined to include the SDT configuration in a case that the SIB1 includes an Information Element (IE) denoted as sdt-ConfigCommon.

4. The method of claim 1, wherein initiating the SDT procedure comprises initiating the SDT procedure while the UE is operating in a Radio Resource Control (RRC) inactive state.

5. The method of claim 1, further comprising:
    receiving, from the BS, a Random Access (RA) configuration that includes an RSRP threshold different from the SDT-specific RSRP threshold; and
    selecting the SUL carrier as the UL carrier for the SDT procedure in response to determining that an RSRP of a downlink (DL) pathloss reference signal is less than the RSRP threshold and the serving cell is configured with the SUL carrier.

6. The method of claim 5, wherein the RSRP threshold is determined by an Information Element (IE) denoted as rsrp-ThresholdSSB-SUL.

7. The method of claim 5, wherein the RSRP threshold has a same value for all Bandwidth Parts (BWPs) of the serving cell.

8. A User Equipment (UE) for performing Small Data Transmission (SDT), the UE comprising:
    transmission and reception circuitry; and
    at least one processor coupled to the transmission and reception circuitry and configured to:
        receive, by the transmission and reception circuitry, from a base station (BS), system information that includes a System Information Block 1 (SIB1);
        initiate an SDT procedure in response to determining that a plurality of conditions is satisfied, the plurality of conditions comprising:
            the SIB1 including an SDT configuration, and
            an SDT-specific Reference Signal Received Power (RSRP) threshold being absent from the SDT configuration;
        in response to initiating the SDT procedure, determine whether a serving cell for the SDT procedure is configured with a Supplementary Uplink (SUL) carrier; and
        select a Normal Uplink (NUL) carrier as an Uplink (UL) carrier for the SDT procedure in response to determining that the serving cell is not configured with the SUL carrier.

9. The UE of claim 8, wherein the SDT-specific RSRP threshold corresponds to an Information Element (IE) denoted as sdt-RSRP-Threshold.

10. The UE of claim 8, wherein the SIB1 is determined to include the SDT configuration in a case that the SIB1 includes an Information Element (IE) denoted as sdt-ConfigCommon.

11. The UE of claim 8, wherein initiating the SDT procedure comprises initiating the SDT procedure while the UE is operating in a Radio Resource Control (RRC) inactive state.

12. The UE of claim 8, wherein the at least one processor is further configured to:

receive, by the transmission and reception circuitry, from the BS, a Random Access (RA) configuration that includes an RSRP threshold different from the SDT- 5 specific RSRP threshold; and select the SUL carrier as the UL carrier for the SDT procedure in response to determining that an RSRP of a downlink (DL) pathloss reference signal is less than the RSRP threshold and the serving cell is configured 10 with the SUL carrier.

13. The UE of claim 12, wherein the RSRP threshold is determined by an Information Element (IE) denoted as rsrp-ThresholdSSB-SUL.

14. The UE of claim 12, wherein the RSRP threshold has 15 a same value for all Bandwidth Parts (BWPs) of the serving cell.

\* \* \* \* \*